(12) United States Patent
Smith et al.

(10) Patent No.: US 10,615,417 B2
(45) Date of Patent: Apr. 7, 2020

(54) ELECTROLYTE MATERIAL, BATTERY ASSEMBLY, AND PRODUCTION METHOD

(71) Applicant: Millibatt, Inc., Los Angeles, CA (US)

(72) Inventors: Leland Smith, Los Angeles, CA (US); Janet Hur, Los Angeles, CA (US); Cheolwoong Lim, Anyang-si (KR); Guangyi Sun, Tianjin (CN)

(73) Assignee: Millibatt, Inc., Los Angeles, CA (US)

( * ) Notice: Subject to any disclaimer, the term of this patent is extended or adjusted under 35 U.S.C. 154(b) by 0 days.

(21) Appl. No.: 15/980,593

(22) Filed: May 15, 2018

(65) Prior Publication Data
US 2018/0342734 A1   Nov. 29, 2018

Related U.S. Application Data

(60) Provisional application No. 62/506,332, filed on May 15, 2017.

(51) Int. Cl.
| | |
|---|---|
| *H01M 4/60* | (2006.01) |
| *H01M 4/04* | (2006.01) |
| *H01M 4/88* | (2006.01) |
| *H01M 10/0585* | (2010.01) |
| *H01M 10/0525* | (2010.01) |

(52) U.S. Cl.
CPC ......... *H01M 4/602* (2013.01); *H01M 4/0409* (2013.01); *H01M 4/8882* (2013.01); *H01M 10/0585* (2013.01); *H01M 10/0525* (2013.01); *H01M 2300/0042* (2013.01)

(58) Field of Classification Search
None
See application file for complete search history.

(56) References Cited

U.S. PATENT DOCUMENTS

| | | | |
|---|---|---|---|
| 7,618,748 B2 | 11/2009 | Nathan et al. | |
| 8,951,694 B2 | 2/2015 | Ben-Youcef et al. | |
| 9,559,349 B2 | 1/2017 | Braun et al. | |
| 2008/0188618 A1* | 8/2008 | Greving | C08F 222/10 525/55 |

(Continued)

FOREIGN PATENT DOCUMENTS

| | | | | |
|---|---|---|---|---|
| KR | 10-1519278 | * | 5/2015 | ........ H01M 10/0565 |
| WO | WO 2014/142311 | * | 9/2014 | ............ B01D 69/08 |
| WO | 2016141027 A2 | | 9/2016 | |

*Primary Examiner* — Amanda J Barrow
(74) *Attorney, Agent, or Firm* — Run8 Patent Group, LLC; Peter Miller

(57) ABSTRACT

One variation of a method for fabricating an electrolyte includes: depositing an electrolyte material over a substrate, the electrolyte material including a monomer miscible in a first volume of solvent, a polymer semi-miscible in the monomer and miscible in the first volume of solvent, and a photoinitiator; exposing the electrolyte material to electromagnetic radiation to disassociate the photoinitiator into a reactive subspecie that crosslinks the monomer to form an electrolyte structure with the polymer phase-separated from the electrolyte structure; dissolving the polymer out of the electrolyte structure with a second volume of solvent to render a network of open-cell pores in the electrolyte structure; and exposing the electrolyte structure to a third volume of solvent and ions to fill the network of open-cell pores with solvated ions.

18 Claims, 8 Drawing Sheets

(56) References Cited

U.S. PATENT DOCUMENTS

| | | | |
|---|---|---|---|
| 2010/0216031 A1* | 8/2010 | Machida | H01M 10/0525 |
| | | | 429/320 |
| 2010/0255376 A1* | 10/2010 | Park | H01M 2/1653 |
| | | | 429/231.8 |
| 2011/0027648 A1 | 2/2011 | Rolison et al. | |
| 2015/0076741 A1* | 3/2015 | Yamada | B29C 39/00 |
| | | | 264/406 |
| 2015/0147641 A1* | 5/2015 | Abd Elhamid | H01M 2/1613 |
| | | | 429/188 |
| 2015/0323811 A1* | 11/2015 | Flitsch | G02C 7/04 |
| | | | 351/159.03 |
| 2016/0038884 A1* | 2/2016 | Hikita | C09D 133/04 |
| | | | 210/500.23 |
| 2016/0133985 A1* | 5/2016 | Harayama | H01M 2/0217 |
| | | | 429/94 |

* cited by examiner

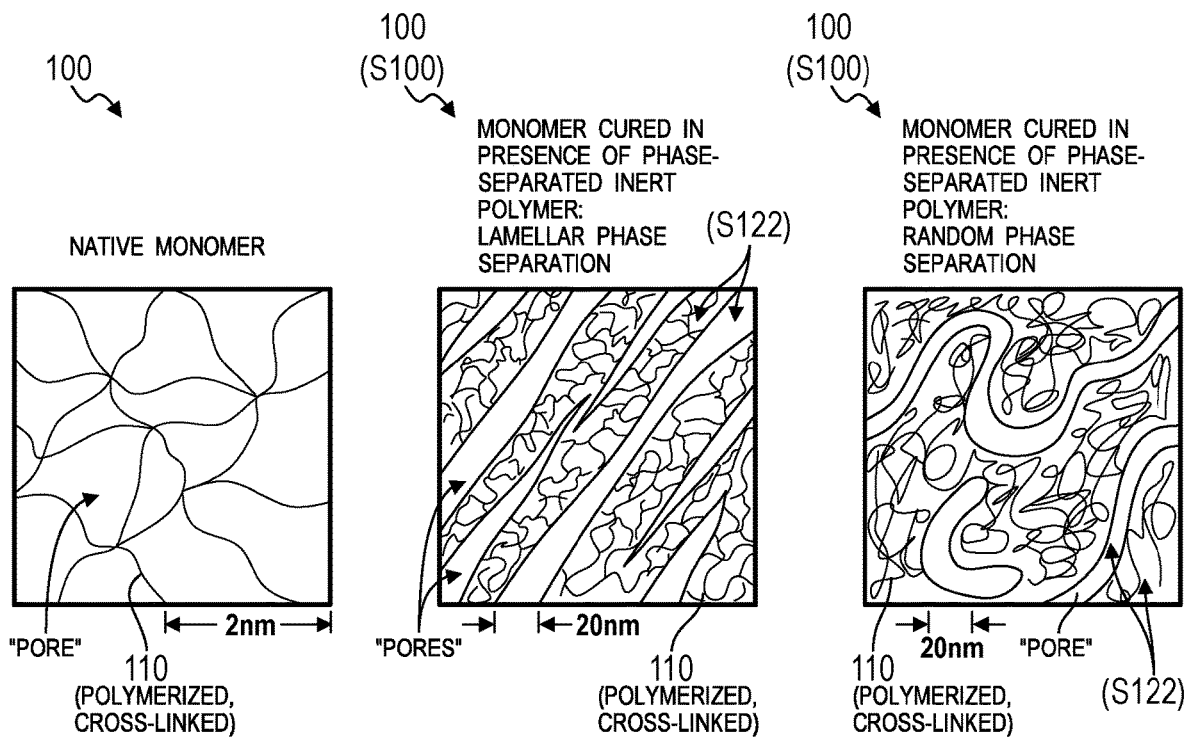
*FIG. 5A*  *FIG. 5B*  *FIG. 5C*
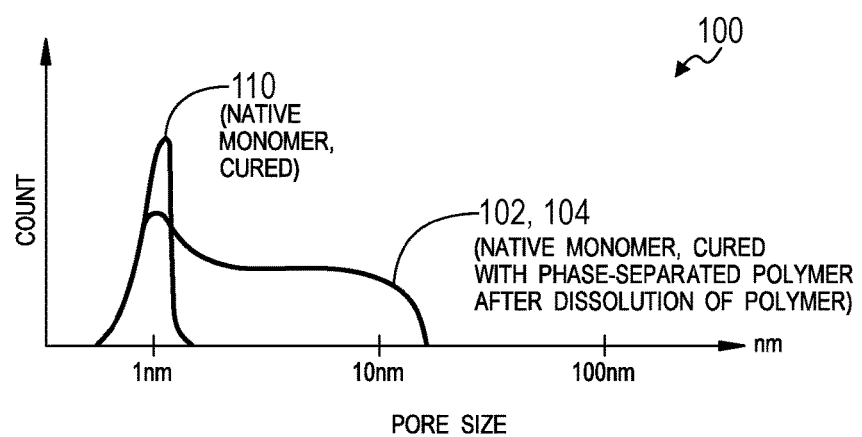
*FIG. 6*

ELECTROLYTE MATERIAL, BATTERY ASSEMBLY, AND PRODUCTION METHOD

CROSS-REFERENCE TO RELATED APPLICATIONS

This application claims the benefit of U.S. Provisional Application No. 62/506,332, filed on 15 May 2017, which is incorporated in its entirety by this reference.

This Application is related to U.S. patent application Ser. No. 15/926,422, filed on 20 Mar. 2018, which is incorporated in its entirety by this reference.

TECHNICAL FIELD

This invention relates generally to the field of battery technologies and more specifically to a new and useful electrolyte material, battery assembly, and production method in the field of battery technologies.

BRIEF DESCRIPTION OF THE FIGURES

FIGS. 5A, 5B, and 5C are schematic representations of one variation of the electrolyte material and the method;

FIG. 6 is a graphical representation of one variation of the electrolyte material;

DESCRIPTION OF THE EMBODIMENTS

Figure 1:
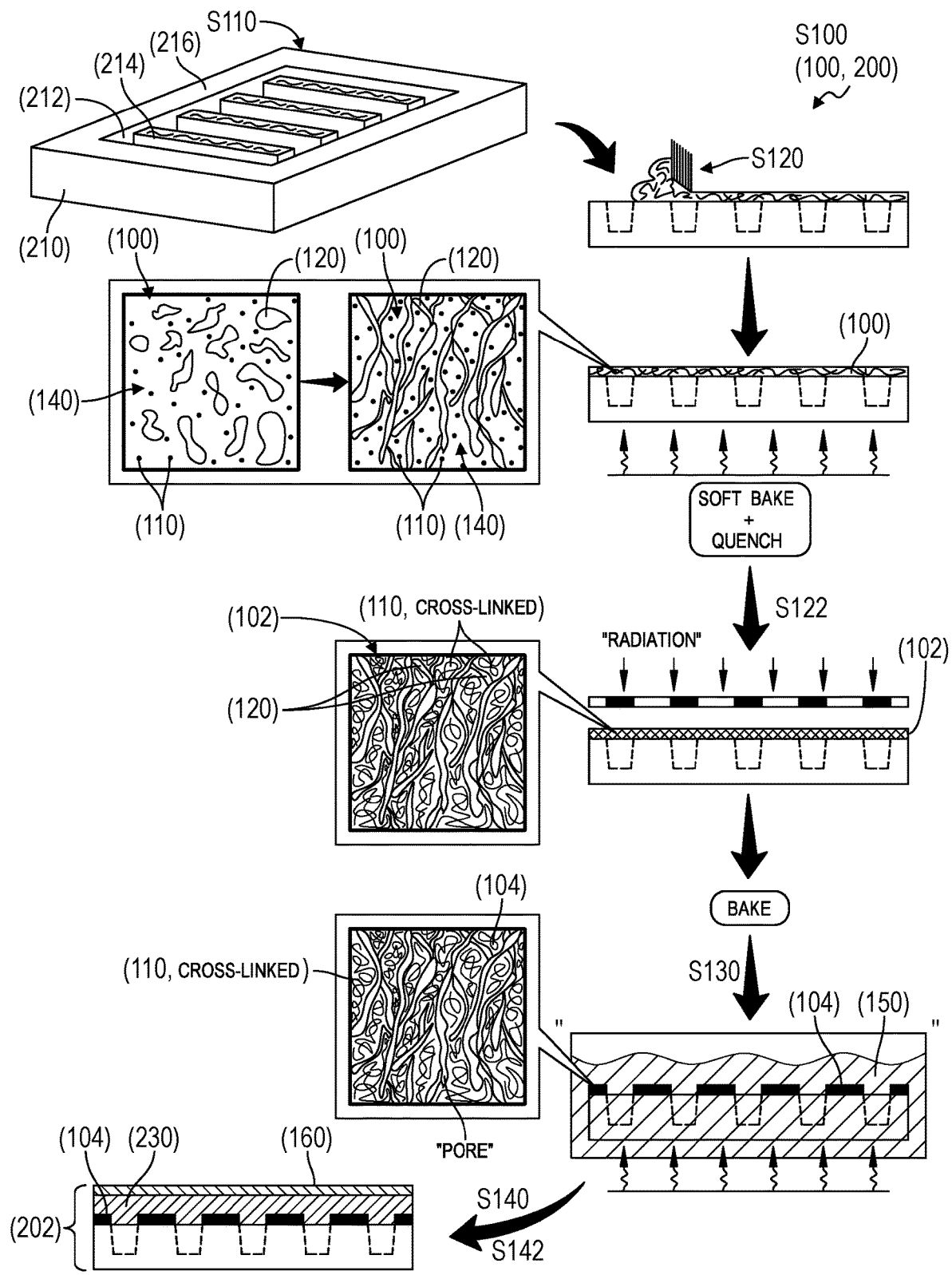
FIG. 1 is a flowchart representation of a method, an electrolyte material, and a battery assembly.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIGS. 1, 2, 3, and 4, a method S100 for fabricating a battery includes: depositing an electrolyte material 100 over a substrate 210 in Block S120, the electrolyte material 100 including a monomer miscible in a first volume of solvent, a polymer semi-miscible in the monomer 110 and miscible in the first volume of solvent, and a photoinitiator 130; exposing the electrolyte material 100 to electromagnetic radiation to disassociate the photoinitiator 130 into a reactive subspecie that crosslinks the monomer 110 to form an electrolyte structure 102 with the polymer 120 phase-separated from the electrolyte structure 102 in Block S122; dissolving the polymer 120 out of the electrolyte structure 102 with a second volume of solvent in Block S130 to render a network of open-cell pores in the electrolyte structure 102; and exposing the electrolyte structure 102 to a third volume of solvent and ions to fill the network of open-cell pores with solvated ions in Block S142.

Figure 2:
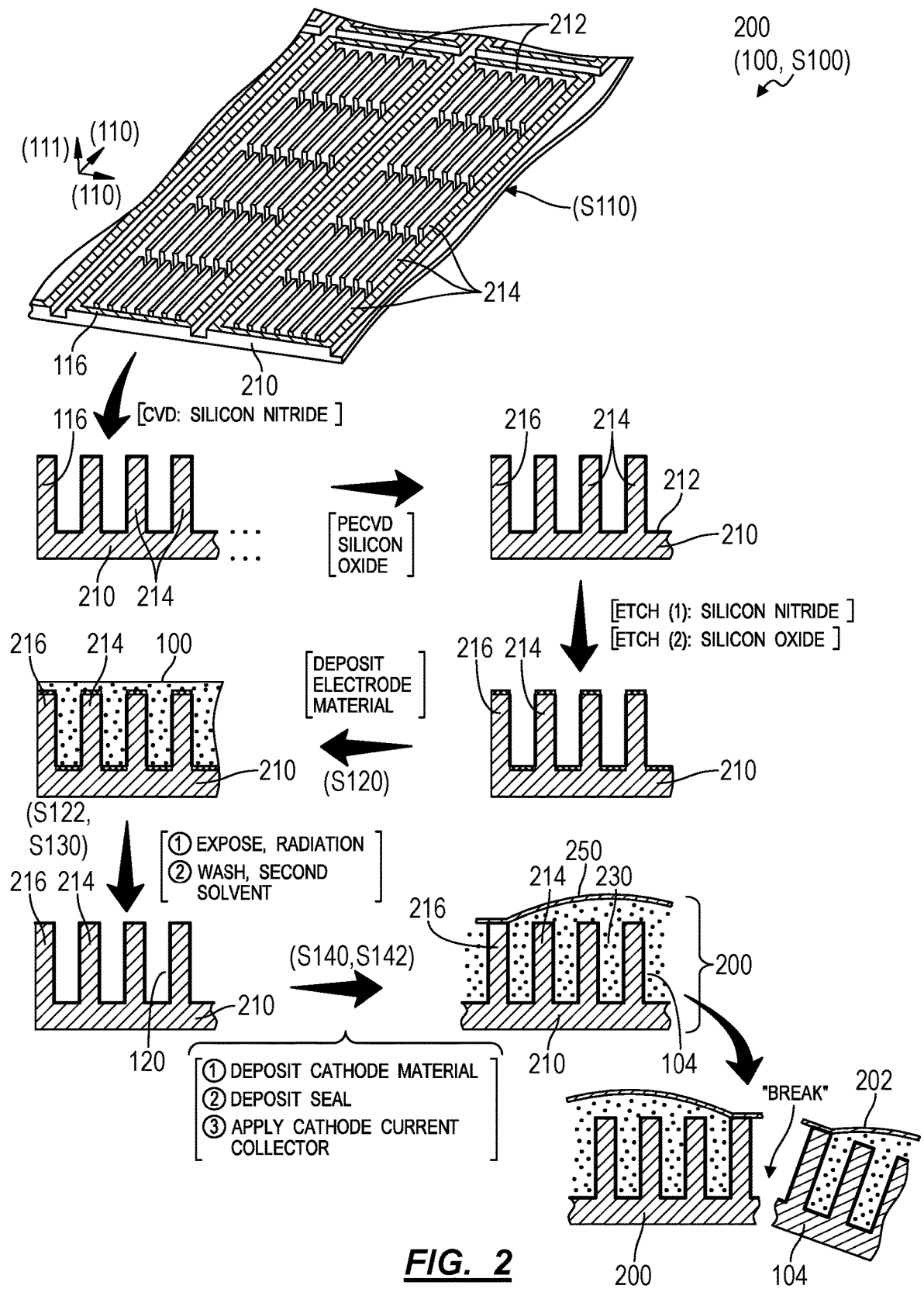
FIG. 2 is a flowchart representation of one variation of the method, the electrolyte material, and the battery assembly.

As shown in FIGS. 1 and 2, one variation of the method S100 includes: fabricating an anode in Block S110; depositing an electrolyte material 100 over the anode in Block S120, the electrolyte material 100 including a monomer miscible in a first volume of solvent, a polymer semi-miscible in the monomer 110 and miscible in the first volume of solvent, and a photoinitiator 130; exposing the electrolyte material 100 to electromagnetic radiation to disassociate the photoinitiator 130 into a reactive subspecie that crosslinks the monomer 110 to form an electrolyte structure 102, over the anode, with the polymer 120 phase-separated from the electrolyte structure 102 in Block S122; dissolving the polymer 120 out of the electrolyte structure 102 with a second volume of solvent in Block S130 to render a network of open-cell pores in the electrolyte structure 102; depositing a cathode material 230 over the electrolyte structure 102 opposite the anode in Block S140, the cathode material 230 including lithium-storing material; and wetting the cathode material 230 with a third volume of solvent to draw solvated lithium ions from the cathode material 230 into the network of open-cell pores in the electrolyte structure 102 in Block S142.

1.1 Electrolyte Material

As shown in FIGS. 1, 7, 8A, and 8B, the method S100 can be executed in conjunction with an electrolyte material 100 that includes, in a first form: a first proportion of a monomer 110 miscible in a solvent; a second proportion of a polymer 120 semi-miscible in the monomer 110 and miscible in the solvent; and a photoinitiator 130 configured to disassociate into a reactive subspecie responsive to exposure to electromagnetic radiation, the reactive subspecie configured to crosslink the monomer. In a second form the electrolyte material 100 can include: the first proportion of the monomer 110 crosslinked by the reactive subspecie to form an electrolyte structure 102 immiscible in the solvent; and the second proportion of the polymer 120 miscible in the solvent and phase-separated from crosslinked monomer in the electrolyte structure 102.

1.2 Battery Assembly

As shown in FIGS. 1, 2, 3, and 4, the method S100 can be executed to produce a battery assembly 200 that includes: an anode; an electrolyte arranged over a first side of the anode, the electrolyte including a monomer crosslinked by a photoinitiator 130 to form an electrolyte structure 102, including a polymer that phase separates from the monomer 110 to form a network of open-celled pores throughout the electrolyte structure 102, and wetted with solvated lithium ions occupying the network of open-celled pores; and a cathode arranged over the electrolyte opposite the anode and including active lithium-storing material, conductive particles exhibiting a dimensional lower bound approximating a dimensional upper bound of open-celled pores in the monomer, lithium salt, a binder, and a solvent configured to transport lithium ions between the cathode and the anode through the network of open-celled pores in the electrolyte.

Figure 11:
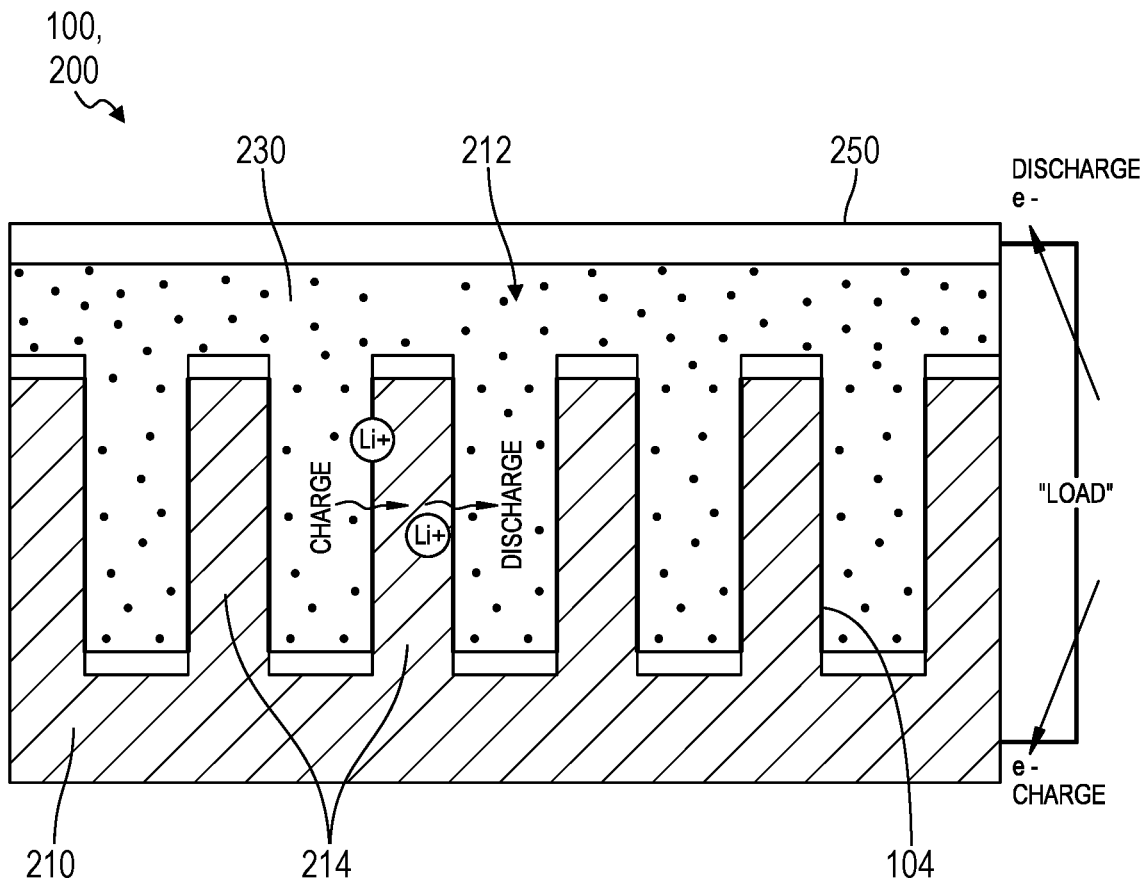
FIG. 11 is a schematic representation of one variation of the electrolyte material and the battery assembly.
Figure 12:
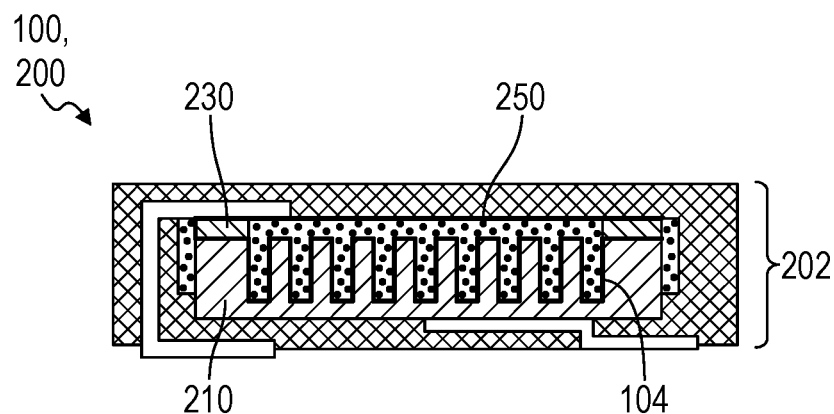
FIG. 12 is a schematic representation of one variation of the electrolyte material and the battery assembly.

As shown in FIGS. 2, 11, and 12, one variation of the battery assembly 200 includes: a silicon-based substrate 210 defining a set of cells 212, each cell containing a set of parallel posts extending in a first direction and encompassed by a continuous wall 216; an electrolyte coating the bottom of each cell, the side and top of each post, and the sides of each wall 216, the electrolyte conforming around posts in each cell, including a monomer crosslinked by a photoinitiator 130 to form an electrolyte structure 102, including a polymer that phase separates from the monomer 110 to form a network of open-celled pores throughout the electrolyte structure 102, and wetted with solvated lithium ions occupying the network of open-celled pores; and a cathode 230 filling each cell over the electrolyte and including active lithium-storing material, a binder, lithium salt, and solvent configured to transport lithium ions between the cathode and the electrode through the network of open-celled pores in the electrolyte.

2. Applications

The method S100 can be executed to fabricate a two-dimensional ("2D") or three-dimensional ("3D") battery including an electrolyte 104 that exhibits a relatively high density of contiguous voids (or "open-celled pores" or "channels") between an anode and a cathode and exhibits a high conductivity to ions flowing between the anode and the cathode these channels are filled with solvated ions, as shown in FIGS. 5B, 5C, and 11. In particular, the method S100 can be executed to fabricate a battery including a rigid, porous electrolyte that: exhibits high electrical resistivity; and defines a dense network of pores with a controlled distribution of cross-sectional open areas and exhibiting low resistance to transport of solvated ions (e.g., lithium ions) between the anode and the cathode while preventing progression of other particles in the cathode through the electrolyte into the anode and vice versa. When incorporated into a 2D or 3D battery, the electrolyte can: exhibit low internal resistance to ion flow within the battery, thereby permitting high power densities for the battery; while also exhibiting high internal electronic resistance, which may reduce a self-discharge rate and enhance charge retention of the battery.

The electrolyte material 100 can include: a photoinitiator 130 configured to "activate" (e.g., dissociate into a reactive subspecie that crosslinks (or "polymerizes") the monomer) in the presence of electromagnetic radiation (e.g., ultraviolet light); a monomer that is miscible in a first solvent 140 and configured to crosslink (e.g., "polymerize") in the presence of activated photoinitiator 130 to form a resilient, electrically-insulative structure; and a polymer that is miscible in the first solvent 140, semi-miscible in the monomer, and configured to phase-separate from the monomer 110 as the monomer 110 crosslinks. Thus, when a volume of the electrolyte material 100 is exposed to electromagnetic radiation, photoinitiator 130 in this volume of electrolyte material 100 dissociates into a reactive subspecie that crosslinks the monomer; the polymer 120 phase-separates from the crosslinked monomer to form a network of polymer chains at substantially uniform density (e.g., a colloidal suspension) throughout the monomer; the size of phase-separated domains between the polymer 120 and the monomer 110 increase as the first solvent is evaporated from this volume of electrolyte material 100; and the monomer 110 in this volume of electrolyte material 100 crosslinks—around phase-separated polymer 120—in the presence of the reactive subspecie.

The resulting electrolyte structure 102 can thus define a rigid structure (e.g., a solid structure or a high-viscosity liquid structure) of crosslinked monomer that is both immiscible in the first solvent 140 and includes a network of polymer chains distributed throughout the rigid structure. Because the polymer 120 is inert to crosslinking (e.g., "polymerization") of the monomer 110 by the photoinitiator 130, the polymer 120 can remain miscible in the first solvent 140 and a second solvent 150. The electrolyte structure 102 can therefore be rinsed or washed with the second solvent 150 to dissolve the polymer 120 out of the electrolyte structure 102, thereby rendering a network of open-cell pores distributed throughout the electrolyte structure 102. The electrolyte structure 102 can then be wetted with a third solvent 160 in the presence of ion-storing material and lithium salt in order to draw solvent and solvated ions into this network of open-cell pores in the electrolyte structure 102. The electrolyte structure 102, solvent, and solvated ions can thus form a rigid electrolyte capable of transporting ions between an anode on one side and a cathode on an opposite side via the network of open-cell pores.

Therefore, both the monomer 110 and polymer can be miscible in a first solvent 140 to form a homogenous, low-viscosity mixture that can be flowed over a surface (e.g., a 2D or 3D anode). For the example, the electrolyte material 100 can initially include 50% of the first solvent 140 by weight, and the electrolyte material 110 can be soft-baked (e.g., at 100° C.) after deposition onto the substrate 210 in order to reduce proportion of the first solvent 140 in the electrolyte material 100 down to less than 10%, thereby increasing the size of phase-separated polymer domains throughout the monomer prior to selective exposure to electromagnetic radiation. When mixed together, the first solvent 140, the monomer, and the polymer 120 can form a "clear" electrolyte material 100 that is substantially transparent to a wavelength of electromagnetic radiation that dissociates the photoinitiator 130 (e.g., x-ray, e-beam, or ultraviolet radiation at an "activation wavelength" between 350 and 400 nanometers). Furthermore, both the monomer 110 and the polymer 120 can exhibit similar indices of refraction. The polymer 120 can also phase-separate from the monomer to produce polymer domains that are—on average—of a size (e.g., exhibit a maximum distance between any pair of atoms) less than the activation wavelength of the photoinitiator 130 such that the electrolyte material 100 exhibits minimal light scattering of incident electromagnetic radiation at the activation wavelength. Because the electrolyte material 100 is transparent and exhibits minimal light scattering of incident electromagnetic radiation at the activation wavelength, a volume of the electrolyte material 100 can be photopatterned with high volumetric selectivity up to a relatively high depth (e.g., hundreds of microns) The electrolyte material 100 can therefore be deposited onto a solid 3D anode and selectively photopatterned to form a thin, rigid, conformal 3D electrolyte structure 102 over the 3D anode. However, because the polymer 120 is miscible in the solvent but only semi-miscible in the monomer, the polymer 120 can phase-separate from the monomer 110 to form an unlinked nanostructure network (e.g., a colloidal suspension) of substantially uniform density throughout a volume of deposited electrolyte material 100 such as following a soft-bake cycle. A reactive subspecie—generated by the photoinitiator 130 responsive to incident electromagnetic radiation—can then cause the monomer 110 to crosslink and to form an electrolyte structure 102 around this unlinked polymer nanostructure. Polymer 120 thus remaining in the electrolyte structure 102 after photopatterning and a second bake cycle can then be removed by washing the electrolyte structure 102 with the second solvent 150, thereby rendering open pores in this conformal electrolyte structure 102 in preparation for introduction of solvated ions to complete the electrolyte 104.

The monomer, polymer, first solvent 140, and photoinitiator 130 can therefore function as an electrolyte material 100 that can be photopatterned and post-processed to produce a rigid, conformal, 2D or 3D electrolyte. Furthermore, this rigid, conformal electrolyte may exhibit relatively high porosity (e.g., greater free volume, greater open pore volume) that yields low internal resistance to solvated ions between an adjacent anode and adjacent cathode. Because the size (e.g., the average width) of the domains of the polymer 120 in the electrolyte material 100 is less than or not substantially more than the size of conductive particles in the adjacent anode and adjacent cathode, this rigid, conformal electrolyte may also exhibit high resistance to transport of other conductive particles from the adjacent anode and adjacent cathode across the electrolyte, thereby inhibiting electrical shorts between the anode and the cathode (e.g., due to dendrite growth from the anode into the electrolyte).

In particular, rather than rely on the natural porosity of a photopolymer structure resulting from exposure of a native photopolymer to electromagnetic radiation as shown in FIG. 5A, the electrolyte material 100 can include both: the native photopolymer (i.e., the monomer 110 and the photoinitiator 130); and an additive (i.e., the polymer 120) that phase-separates from the native photopolymer to produce a contiguous network of voids of controlled dimension throughout a volume of native photopolymer that has crosslinked upon exposure to electromagnetic radiation. Once the additive is dissolved out the native photopolymer structure, the resulting network of open-celled pores may exhibit large cross-section dimensions, as shown in FIGS. 5B and 5C, and thus support greater flux of solvated ions through the electrolyte while also preventing propagation of other conductive particles from the cathode toward the anode, and vice versa.

Figure 7:
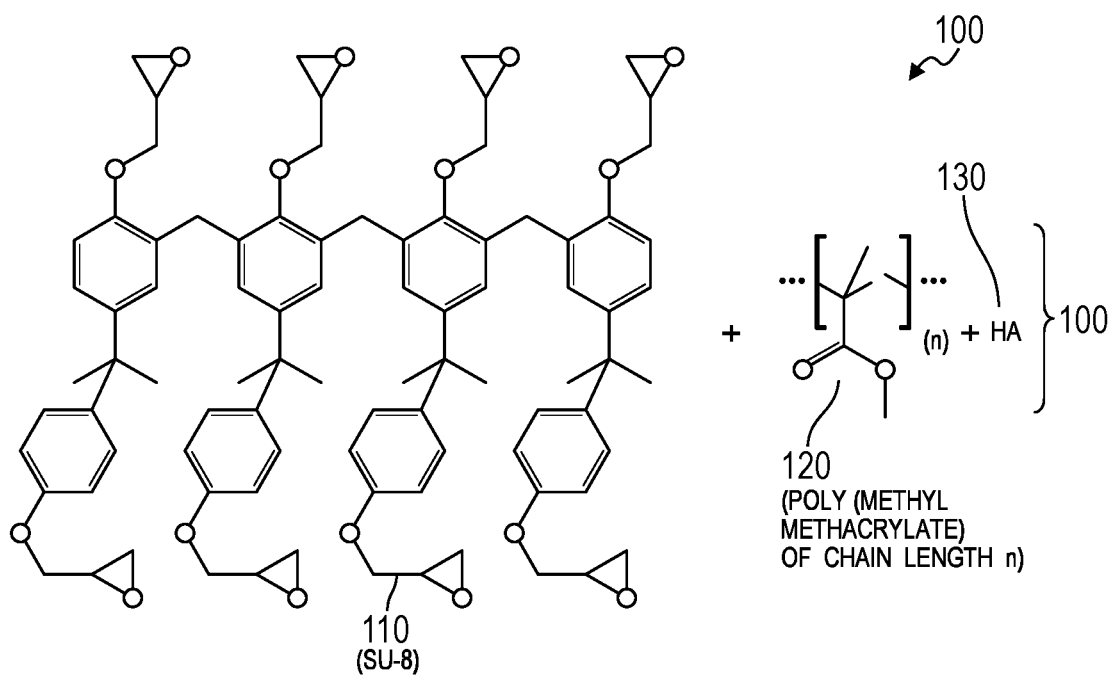
FIG. 7 is a graphical representation of one variation of the electrolyte material.
Figure 8A:
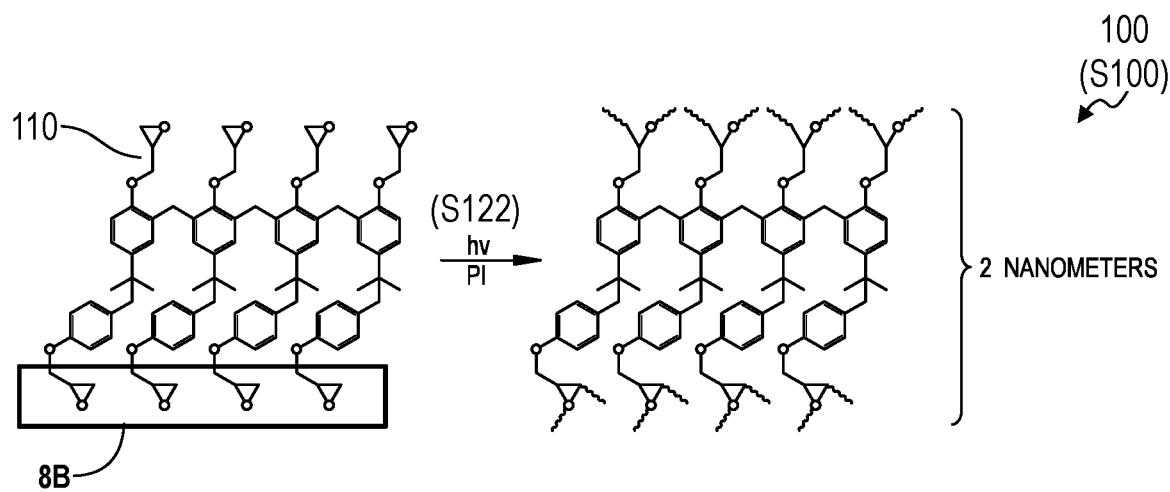
FIGS. 8A and 8B are graphical representations of one variation of the electrolyte material and the method.
Figure 8B:
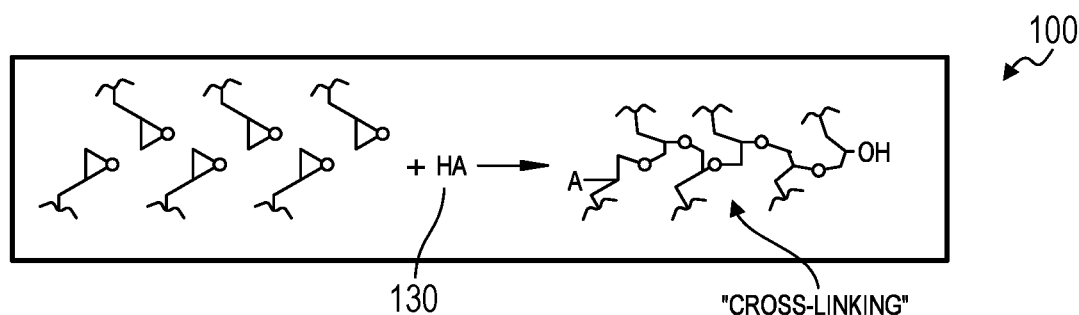
Figure 9:
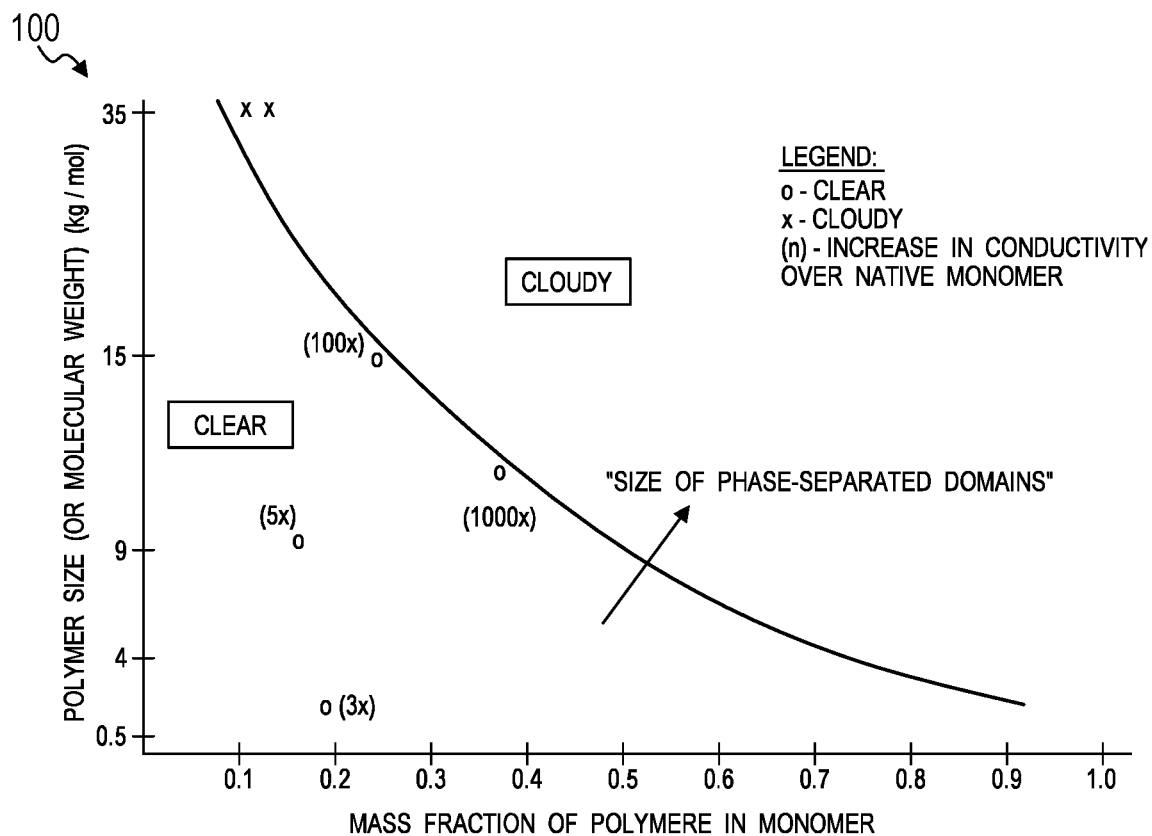
FIG. 9 is a graphical representation of one variation of the electrolyte material.

In one example shown in FIGS. 7, 8A, and 8B: the first solvent 140 includes cyclopentanone or gamma-butyrolactone; the monomer 110 includes an epoxy-based negative photoresist, such as a bisphenol a novolac epoxy (e.g., "SU-8"); the photoinitiator 130 includes a photoacid generator, such as triarylsulfonium/hexafluoroantimonate salt; the polymer 120 includes poly(methyl methacrylate); and the second solvent 150 can include cyclopentanone or propylene glycol monomethyl ether acetate. In this example, the electrolyte material 100 can be deposited onto a silicon-based anode and post-processed to form a rigid, conformal electrolyte structure 102 directly over the anode; and cathode material 230—such as including active lithium-storing material, carbon (e.g., graphitic carbon or carbon black), and lithium salt in solution with propylene carbonate—can be deposited directly over the electrolyte structure 102 to form a rigid, conformal cathode and to fill the electrolyte structure 102 with solvated ions, thereby completing a battery cell.

Figure 3:
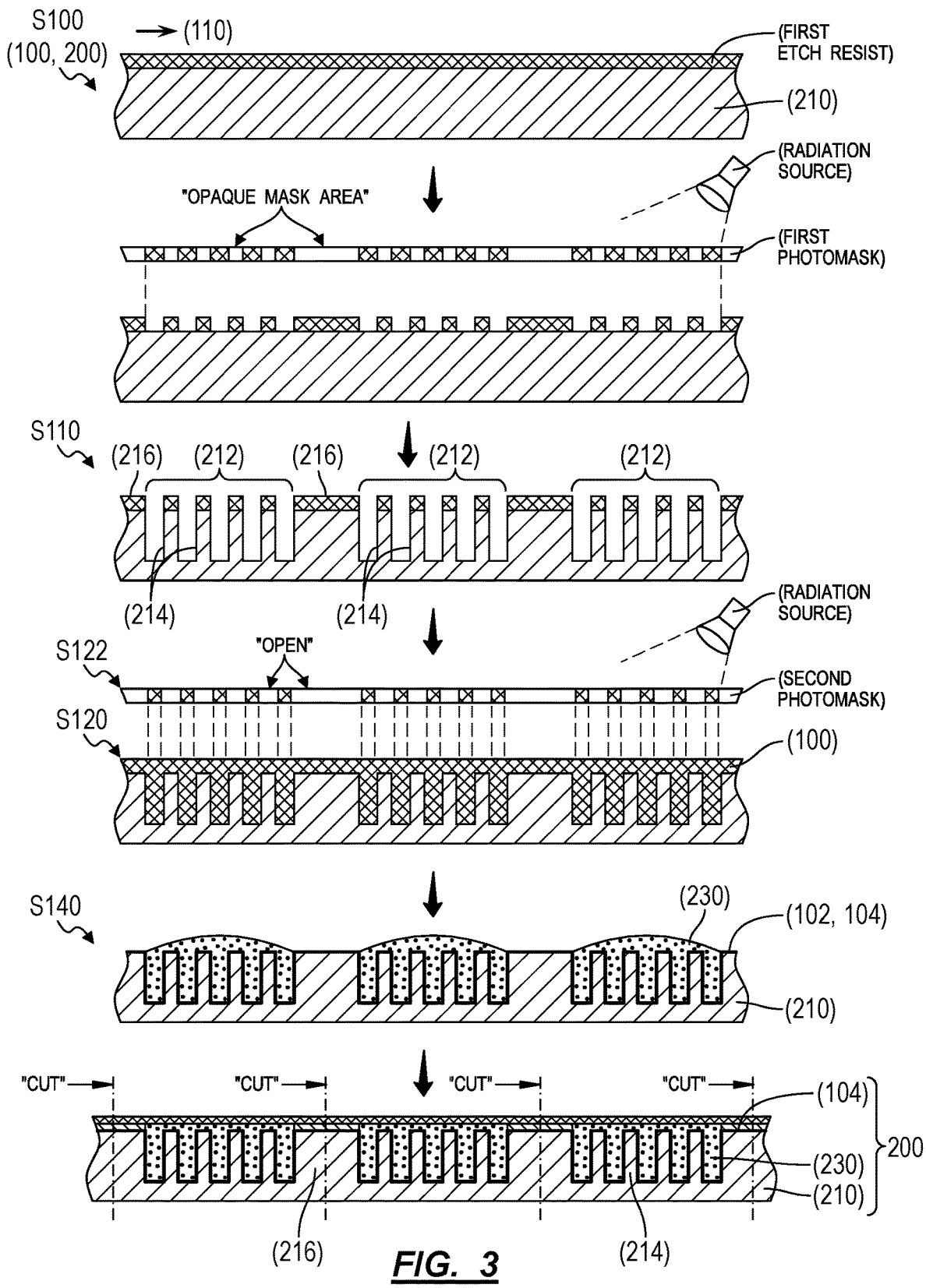
FIG. 3 is a flowchart representation of one variation of the method, the electrolyte material, and the battery assembly.
Figure 4:
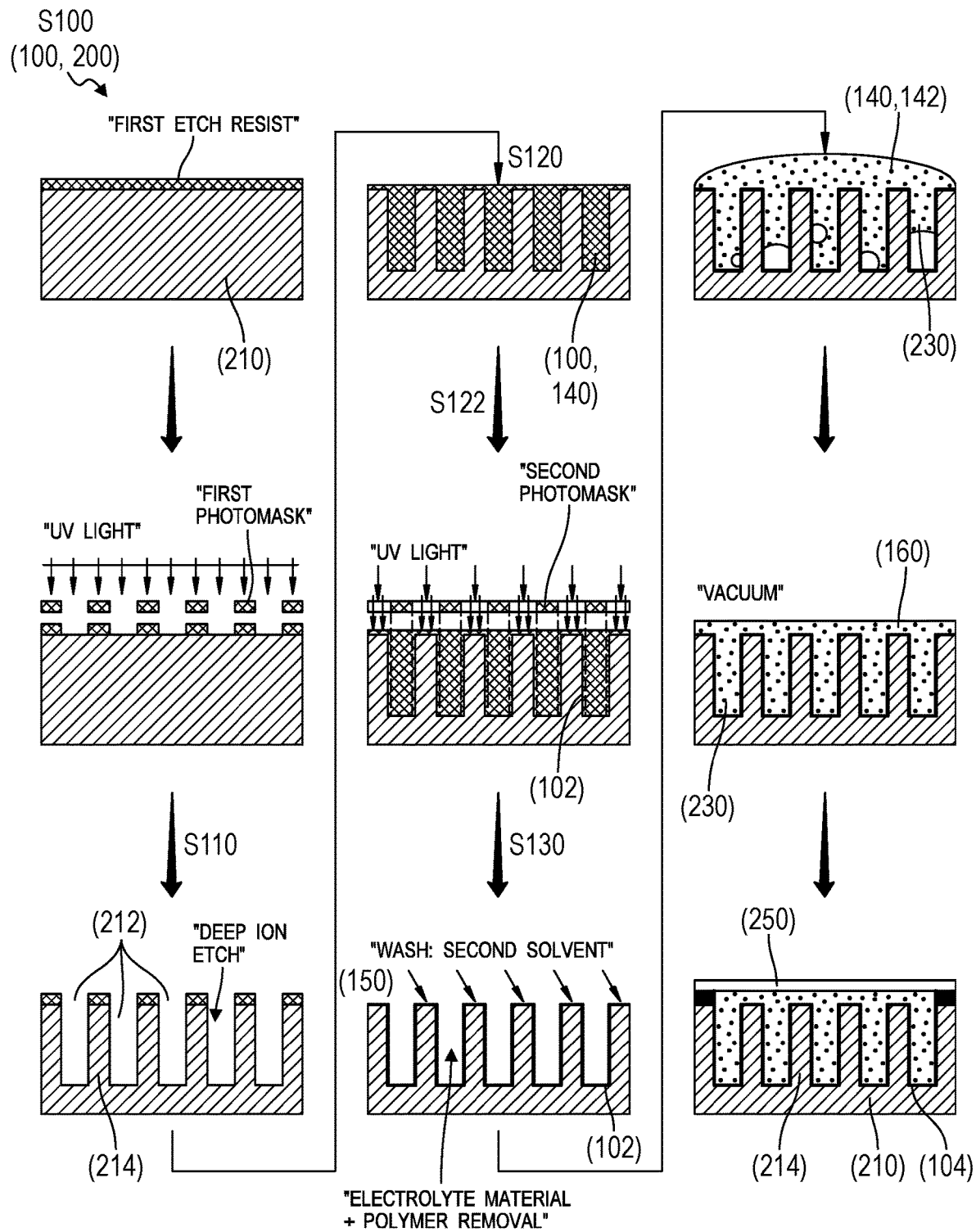
FIG. 4 is a flowchart representation of one variation of the method, the electrolyte material, and the battery assembly.

The method S100 is described below as executed to: photopattern the electrolyte material 100 onto a rigid, 3D anode; to post-process the electrolyte material 100 to produce a porous, rigid, conformal 3D electrolyte; and to fabricate a porous, rigid, 3D cathode over the 3D electrolyte in situ, as shown in FIGS. 1, 3, and 4. However, the method S100 can be similarly implemented to produce a 2D electrolyte, to produce an electrolyte directly over a cathode, and/or to produce a separate, discrete electrolyte structure 102 or electrolyte for subsequence assembly with an anode and cathode to form a battery, etc.

3. Terms

As described above, the electrolyte material 100 includes the monomer, which crosslinks (e.g., polymerizes) in the presence of a reactive subspecie generated by the photoinitiator 130 when exposed to electromagnetic radiation. The monomer 110 can therefore exist in a native, uncrosslinked form in the electrolyte material 100 (hereinafter the monomer) and in crosslinked form in an electrolyte structure 102 (hereinafter the "crosslinked monomer"). Both the native, uncrosslinked forms of the monomer 110 and the crosslinked form of the monomer 110 (i.e., a "polymer") are referred to hereinafter as the "monomer 110."

The combination of the monomer 110 in native, uncrosslinked form, the polymer, and the photoinitiator 130 prior to dissociation into the reactive subspecie(s) are referred to herein as the electrolyte material 100. The electrolyte material 100 can also include the first solvent 140.

The monomer 110 crosslinks in the presence of the reactive subspecie—produced by the photoinitiator 130 following exposure to electromagnetic radiation—to form the electrolyte structure 102 initially including an unlinked nanostructure network of the polymer 120 phase-separated from the crosslinked monomer. The electrolyte structure 102 can define a rigid, solid structure or a high-viscosity liquid structure, which may be substantially transparent to visible light. The electrolyte structure 102 is later washed or rinsed with solvent to remove the polymer 120 from the electrolyte structure 102, thereby rendering a network of open-cell pores in the electrolyte structure 102. The electrolyte structure 102 can define this network of open-cell pores at substantially uniform density throughout its volume, and these open-cell pores can extend from one surface of the electrolyte structure 102 to the opposing surface of the electrolyte structure 102.

Once the polymer 120 is removed from the electrolyte structure 102, the porous electrolyte structure 102 can be wetted with solvated ions to form an electrolyte 104. For example, a lithium-ion-conducting solution (e.g., Propylene carbonate and $LiPF_6$) can be introduced to the electrolyte structure 102 to fill open-cell pores in the electrolyte structure 102 with solvated lithium ions to form a lithium-ion-carrying electrolyte for a lithium-ion battery. In another example, an aqueous hydrogen-ion-conducting solution can be introduced to the electrolyte structure 102 to fill open-cell pores in the electrolyte structure 102 with solvated hydrogen ions to form a hydrogen-ion-carrying electrolyte for a hydrogen fuel cell. In yet another example, an aqueous potassium hydroxide solution can be introduced to the electrolyte structure 102 to fill open-cell pores in the electrolyte structure 102 with solvated ions to form an ion-carrying electrolyte for a nickel-metal hydride battery.

4. Battery Fabrication

The method S100 can be executed to fabricate a rigid electrolyte during production of a 2D or 3D single-cell or multi-cell battery assembly 200. For example bulk micromachining and photolithography processes can be implemented to: fabricate an anode on a silicon wafer in Block S110; deposit and process the electrolyte material 100 over the anode to form a rigid porous electrolyte structure 102 in Blocks S120, S122, and S130; and fabricate a cathode over the electrolyte to produce a battery assembly 200 in Blocks S140 and S142. Wafer processing procedures can then be implemented to dice and package the battery assembly 200 into multiple discrete, single- or multi-cell 2D or 3D battery units 202. In this example, existing bulk micro-machining and photolithography techniques can be implemented according to the method S100 to transform one silicon wafer into a battery assembly 200 containing many (e.g., hundreds of) discrete, sealed, single-cell batteries; these single-cell batteries can then be separated from the battery assembly 200 via existing wafer processing techniques to form many battery units 202, as shown in FIGS. 2 and 3.

The high ion conductivity and high electrical resistance characteristics of the electrolyte thus fabricated over the silicon wafer (i.e., across the anode) can yield relatively high power density, low self-discharge rate, and enhanced charge retention in each of these single-cell batteries. Furthermore, this porous electrolyte structure 102 fabricated over the silicon wafer can be wetted with lithium ions—dissolved in the third solvent 160—to complete the electrolyte in Block S142. This third solvent 160 (e.g., N-Methyl-2-pyrrolidone, Dimethyl sulfoxide, Propylene carbonate, 2,5,8,11,14-Pentaoxapentadecane) can exhibit a high boiling point (e.g., over 242° C. for Propylene carbonate) and low flammability such that the single-cell batteries separated from the battery assembly 200 can be post-processed at elevated temperatures.

For example, a single-cell battery or an assembly of discrete single-cell batteries—separated from the battery assembly 200—can then be encased in an SMT or through-hole package to form a battery unit 202 configured for installation directly onto a printed circuit board. For example, this SMT or through-hole battery unit 202 can be adhered to a PCB—along with other circuit components—with solder paste, and this PCB assembly can then be then passed through a reflow oven to affix both circuit components and the battery unit 202 to the PCB simultaneously, thereby completing the PCB assembly in a single pick-and-place and reflow cycle.

5. Anode

One variation of the method S100 shown in FIGS. 1, 2, 3, and 4, includes Block S110, which recites fabricating an anode. Generally, in this variation, the electrolyte material 100 is deposited directly onto a substrate 210 defining a 2D or 3D anode.

In one implementation, the battery assembly 200 defines a 3D battery including a doped silicon-based substrate 210 defining a set of cells 212, wherein each cell contains a set of parallel posts extending in a first direction and encompassed by a continuous wall 216, as shown in FIGS. 1 and 2. The substrate 210 can thus define an anode material into which multiple cells—each containing multiple anode posts—are directly etched. In this implementation, each cell can include multiple anode posts extending from a common anode current collector and bounded on all sides by a wall 216, all of which are fabricated from a singular substrate 210 (e.g., a mono-crystalline silicon wafer). Each cell thus fabricated on the substrate 210 can then be coated with electrolyte material 100 to form an electrolyte 104, as described below. This electrolyte can then be coated with cathode material 230 to form many battery cells within the greater battery assembly 200, as described below.

As shown in FIGS. 1, 2, and 3, the substrate 210 can include a silicon wafer, such as a 4"-, 6"-, or 8"-diameter silicon wafer, that is processed to form multiple discrete cells—separated by continuous walls 216 and containing anode posts—directly in one side of the substrate 210. For example, a deep reactive ion etching (e.g., "DRIE") process can be implemented to remove material from the substrate 210 where not masked by an etch resist in order to form multiple cells in the silicon wafer, wherein each cell is bounded on all sides by a wall 216 and contains multiple parallel and offset posts extending up to (or slightly below) the top of the adjacent wall 216(s).

In another variation, the battery assembly 200 defines a 2D battery, and the anode can include a planar substrate 210, such as a p-type or n-type doped silicon wafer. However, the anode (or the substrate 210) can be of any other material and can be fabricated in any other way, such as described in U.S. patent application Ser. No. 15/926,422.

6. Electrolyte Material

In an first form (e.g., an "uncrosslinked state") shown in FIG. 7, the electrolyte material 100 includes: a first solvent 140; a monomer miscible in the first solvent 140; a polymer miscible in the first solvent 140 and semi-miscible in the monomer 110; and a photoinitiator 130 that dissociates into a reactive subspecie—when exposed to electromagnetic radiation—that causes the monomer 110 to crosslink. In the first form, the electrolyte material 100 can exhibit a viscosity sufficiently low to enable the electrolyte material 100 to be flowed over a substrate 210 (e.g., spin coated or doctor bladed to fill in cells and to flow around posts in a 3D anode) during production of a battery assembly 200, as described below. In the first form, the monomer 110 and the polymer 120 can also be mixed in the first solvent 140 (e.g., 50% first solvent 140 by weight) to form a homogenous mixture that is substantially transparent to electromagnetic radiation within a spectrum that activates the photoinitiator 130.

The electrolyte material 100 is then soft-baked to evaporate the first solvent 140, such as to reduce the proportion of the first solvent in the electrolyte material 100 to less than 10% by weight, thereby causing the polymer 120 to phase-separate from the uncrosslinked monomer.

In a second form (e.g., as an "unprocessed electrolyte structure 102") shown in FIGS. 1, 8A, and 8B, the photoinitiator 130 is then activated by exposure to electromagnetic radiation; once activated, the photoinitiator 130 crosslinks the monomer 110 to form a rigid electrolyte structure 102 around the phase-separated polymer 120, which is inert to reactions between the monomer 110 and the activated photoinitiator 130. For example, the polymer 120 can be phase-separated from the monomer 110 and entangle to form a colloidal suspension throughout the electrolyte structure 102; in the second form, the monomer can be crosslinked—by the reactive subspecie—around this colloidal suspension.

In a third form (e.g., as a "porous electrolyte structure 102") shown in FIGS. 1, 5B, and 5C, the electrolyte material 100 forming the electrolyte structure 102 is baked and then rinsed or washed with solvent to dissolve the polymer 120 out of the electrolyte structure 102, thereby rendering a network of open-cell pores throughout the electrolyte structure 102. In particular, in the third form, the polymer 120—in suspension in the electrolyte structure 102—is dissolved out of the electrolyte structure 102 to render the network of open-cell pores in the electrolyte structure 102. For example: in the first form, the electrolyte material 100 can include between 55% and 65% by volume of the monomer 110 (e.g., an epoxy-based negative photoresist) and between 35% and 45% by volume of the polymer 120 (e.g., a synthetic polymer of an organic compound); and, in the third form, the polymer 120 can be dissolved out of the electrolyte structure 102 by the solvent (e.g., an organic cyclic ketone) to render an open pore volume between 35% and 45% in the electrolyte structure 102. Furthermore, the molecular weight of the polymer 120 can be sized such that the network of open-cell pores—left in the electrolyte structure 102 in the third form following removal of the polymer 120—is characterized by an average cross-sectional width greater than a width of solvated ions.

Figure 10:
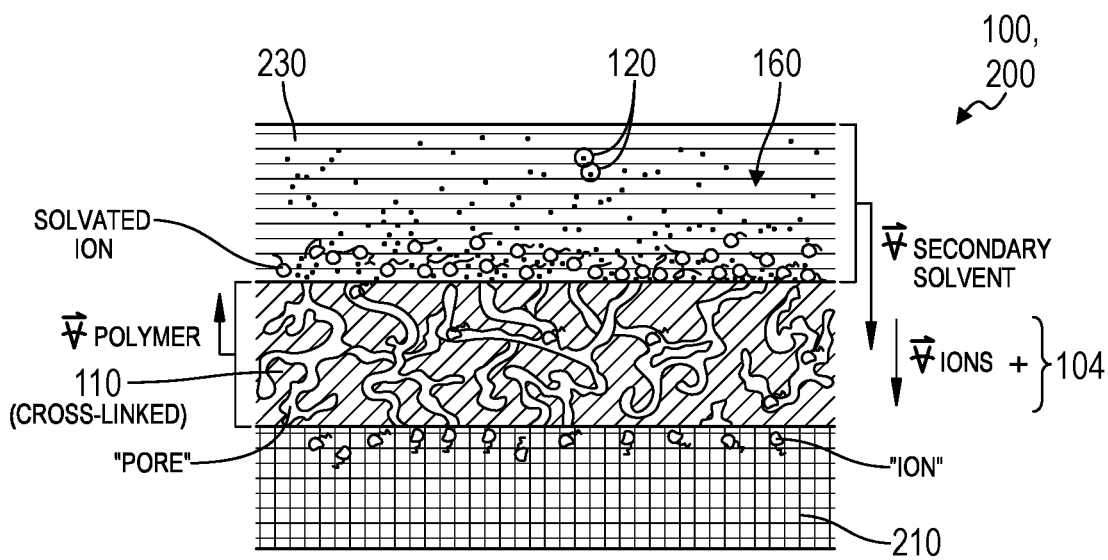
FIG. 10 is a schematic representation of one variation of the electrolyte material and the battery assembly.

In a fourth form (e.g., as an "electrolyte 104") shown in FIGS. 1 and 10, the network of open-cell pores in the electrolyte structure 102 is filled with a volume of solvated ions and solvent to form an electrolyte 104. This completed electrolyte 104 can thus conduct solvated ions between an adjacent anode and an adjacent cathode, thereby facilitating chemical reactions between the anode and the cathode that may deliver energy to an external electrical circuit, as shown in FIG. 11.

(The electrolyte structure 102 can additionally or alternatively function as a buffer or electrode separator between the anode and the cathode in order to prevent flow of electrons between the anode and the cathode inside a battery unit 202 (i.e., to prevent electrical shorts).

6.1 Monomer, Photoinitiator, and First Solvent

In one implementation shown in FIG. 7: the monomer 110 includes a polymeric epoxy resin (e.g., SU-8); and the photoinitiator 130 includes a photoacid generator (e.g., from the family of triarylium-sulfonium salts). In the first form of the electrolyte material 100, the monomer 110 and the photoinitiator 130 can also be combined with the first solvent 140 to form a homogenous mixture exhibiting a sufficiently-low viscosity to enable the electrolyte material 100 to be spin-coated or doctor bladed across a surface. For example, the first solvent 140 can include cyclopentanone or gamma-Butyrolactone, and the electrolyte material 100 can include approximately 50% by mass cyclopentanone when deposited onto a substrate and less than 10% cyclopentanone once soft-baked and prior to selective exposure to electromagnetic radiation.

When exposed to electromagnetic radiation (e.g., UV light), the photoinitiator 130 dissociates into a reactive subspecie, such as a photoacid. The electrolyte material 100 can then be heated (e.g., above its glass transition temperature during a post-exposure bake cycle) to accelerate reaction between the photoacid and epoxide rings on the ends of the monomers, thereby locally crosslinking (i.e., polymerizing, or "curing") these monomers before the photoacid diffuses throughout the greater volume of deposited electrolyte material 100 and thus enabling highly-selective crosslinking of the monomer.

In particular, the photoinitiator 130 can selectively dissociate into the reactive subspecie (substantially) only where exposed to electromagnetic radiation. Epoxy groups in each monomer molecule in a volume of deposited electrolyte material 100 can react with and covalently bond to an epoxy group in the same monomer molecules or in other monomer molecules in the electrolyte material 100 where the photoinitiator 130 has dissociated into the reactive subspecie (i.e., where the electrolyte material 100 has been exposed to electromagnetic radiation and where the reactive subspecie is now present) but not where the reactive subspecie is not present (i.e., where the electrolyte material 100 has not been exposed to electromagnetic radiation). Cross-linked monomer molecules in the electrolyte material 100 can thus form a dense polymer network: that is immiscible in the first, second, and/or third solvents 140, 150, 160; and that is electrically insulative.

The dense polymer network (i.e., the electrolyte structure 102) thus formed by these cross-linked monomer molecules may also naturally exhibit a degree of porosity, which may support ion propagation through its thickness, as shown in FIG. 5A. However, to support greater ion flux throughout the electrolyte structure 102 and thus achieve lower internal resistance and high power density in a battery containing an electrolyte 104 fabricated with the electrolyte material 100, the electrolyte material 100 can also include an additive (i.e., the polymer 120) that: is miscible in the first solvent 140; phases-separates from the monomer 110 to form phase-separated domains in the monomer 110 as the first solvent 140 is evaporated from the electrolyte material 100 after deposition onto a substrate; and yields greater porosity, more uniform porosity, and/or greater pore size through controllable pathways within a electrolyte structure 102 once the electrolyte material 100 is selectively exposed to electromagnetic radiation and once the additive is dissolved out of the electrolyte structure 102, as shown in FIGS. 5B, 5C, and 6.

6.2 Polymer

Generally, the polymer 120 functions: in the first form of the electrolyte material 100, to mix with the first solvent 140, the monomer, and the photoinitiator 130 to form a homogenous mixture; and, in the second form of the electrolyte material 100, to phase separate from the monomer 110 while remaining substantially uniformly dispersed throughout the monomer 110 as the monomer 110 crosslinks in the presence of the activated photoinitiator 130, as shown in FIGS. 1, 5A and 5B. In particular, in the second form, the polymer 120 can form a substantially uniform network of voids throughout the electrolyte structure 102 formed by crosslinked monomer.

The polymer 120 can also remain miscible in the first and second solvents 140, 150 following crosslinking of the monomer 110 by activated photoinitiator 130; when the electrolyte structure 102 is rinsed with the second solvent 150 in Block S130, the second solvent 150 can dissolve the polymer 120 out of the electrolyte structure 102, thereby rendering the network of open-celled pores—of substantially uniform density and cross-section—throughout the electrolyte structure 102. These voids can then be filled with solvated lithium ions to complete the electrode in Block S142.

6.2.1 Polymer Miscible in First Solvent and Semi-Miscible in Monomer

The polymer 120 can be miscible in the first solvent 140 (e.g., Cyclopentanone, gamma-butyrolactone) such that polymer: forms a homogenous mixture in the first solvent 140 in the first form of the electrolyte material 100; and can be dissolved out of the electrolyte structure 102 by the second solvent 150 in the second form of the electrolyte material 100.

The polymer 120 can also be semi-miscible (e.g., semi-soluble) in the monomer 110 such that the polymer 120 and the monomer 110 form a homogenous mixture in the first solvent 140 in the first form of the electrolyte material 100. However, the polymer 120 can also phase separate from the monomer 110 on a small (e.g., 10-nanometer) scale—such as under certain temperature, pressure, composition, and concentration conditions, as described below—such that the polymer 120 forms a separate network of unlinked polymer chains throughout the monomer 110 as the monomer 110 crosslinks into the electrolyte structure 102. For example, polymer molecules can phase separate from the monomer 110 and cluster (e.g., entangle, aggregate, or "clump") to form an unlinked nanostructure network (e.g., a colloidal suspension or percolated network) throughout the monomer.

In one example, the monomer 110 includes monomers of an epoxy-based negative photoresist; and the polymer 120 includes Poly(methyl methacrylate) (or "PMMA") molecules of molecular weight similar to the molecular weight of the monomer, which may produce small, controlled phase-separated domains on the order of 20 nanometers in the electrolyte material 100, which may yield a substantially uniform distribution of polymer throughout a volume of the electrolyte material 100 as the monomer 110 crosslinks, and which may thus yield a network of open-cell pores of substantially uniform density throughout the entire volume of the resulting electrolyte structure 102.

6.2.2 Optical Characteristics

The polymer 120 and the monomer 110 can be mixed with the solvent to form a mixture that exhibits minimal light scattering and minimal absorption of electromagnetic radiation at the activation wavelength—other than by the photoinitiator 130—in order to enable the electrolyte material 100 to be photopatterned with high volumetric selectivity at relatively large depths or film thicknesses of the electrolyte material 100 (e.g., more than 500 microns). In particular, the polymer, the monomer, and the first solvent 140 can be substantially optically-transparent (e.g., exhibit more than 95% light transmission) to electromagnetic radiation at the activation wavelength of the photoinitiator 130. For example, in order to limit absorption and scattering of electromagnetic radiation at the activation wavelength of the photoinitiator 130 by the electrolyte material 100, the polymer 120 can phase-separate from the monomer to produce polymer domains that are—on average—of a size less than the activation wavelength of the photoinitiator 130. The polymer 120 and the monomer 110 can also exhibit similar indices of refraction at the activation wavelength in order to limit light scattering of electromagnetic radiation at the activation wavelength by the electrolyte material 100.

In this example: the photoinitiator 130 can locally dissociate into the reactive subspecie responsive to incident electromagnetic radiation at the activation wavelength (e.g., 350 to 400 nanometers); the monomer 110—in the first form of the electrolyte material 100—can be characterized by a first molar mass, and a first index of refraction at the activation wavelength; and the polymer 120—in the first and second forms of the electrolyte material 100—can be characterized by a second average molar mass approximating the first molar mass and a second index of refraction at the activation wavelength approximating the first index of refraction.

By thus exhibiting minimal scattering and minimal absorption of electromagnetic radiation at the activation wavelength—other than by the photoinitiator 130—a layer of electrolyte material 100 deposited onto a substrate 210 can enable electromagnetic radiation at the activation wavelength to propagate through the full thickness of this electrolyte material 100 layer, thereby enabling this electromagnetic radiation to activate the photoinitiator 130 and thus crosslink the monomer 110 up to the full thickness of this layer of electrolyte material 100. Furthermore, by exhibiting minimal scattering of electromagnetic radiation at the activation wavelength—other than by the photoinitiator 130—a pattern of electromagnetic radiation projected onto this layer of electrolyte material 100 may be preserved with high resolution throughout the thickness of this layer of electrolyte material 100, thereby enabling this layer of electrolyte material 100 to be photopatterned with high volumetric selectivity.

6.2.3 Polymer Inert to Crosslinking of Monomer

The polymer 120 can also be non-participating (i.e., "inert") to the reaction that crosslinks (e.g., polymerizes) monomer molecules in the electrolyte material 100 and otherwise occupy space within the electrolyte material 100 as the monomer 110 crosslinks in the presence of activated photoinitiator 130. The polymer 120 can also remain miscible in the first and second solvents 140, 150 following crosslinking of the monomer 110 by activated photoinitiator 130. In particular, the polymer: may exhibit little or no affect on crosslinking of the monomer; and may not itself crosslink or further crosslink in the presence of the photoinitiator 130, reactive subspecie, or monomer such that the polymer 120 may be dissolved out of the electrolyte structure 102 by the second solvent 150 to render the network of open-cell pores throughout the thickness of the electrolyte.

6.2.4 Polymer Size

The size of the polymer 120 can be selected such that polymer molecules form phase-separate domains—in the monomer 110—slightly (e.g., 50% to 1000%) greater than the average cross-sectional dimension of solvated ions. When the polymer 120 is thus removed from the electrolyte structure 102 in Block S130, open-cell pores thus rendered in the electrolyte structure 102 can define geometries: large enough to pass fully-solvated ions through the thickness of the electrolyte structure 102 (e.g., between the anode on one side and the cathode on the opposing side), as shown in FIGS. 5B, 5C, 6, and 10, which may increase internal ion conductivity for a battery unit 202 containing this electrolyte; and small enough to prevent conductive particles from the anode and cathode from migrating through the electrolyte, thereby preventing electrical shorts inside this battery unit 202.

As the monomer 110 crosslinks in the presence of the reactive subspecie, the unlinked network of polymer molecules formed can physically obstruct local crosslinking of monomer molecules, as shown in FIGS. 1, 5B, and 5C. A volume of the electrolyte material 100 exposed to electromagnetic radiation can thus crosslink around the unlinked network of polymer molecules in this volume in the second form of the electrolyte material 100, thereby yielding an open-cell network of voids (or "pores") in the dense polymer network of crosslinked monomer with polymer molecules trapped in these voids. These polymer molecules can then be removed from this network of open-cell pores in the electrolyte structure 102 by the second solvent 150—such as by washing or rinsing with the second solvent 150 in Block S130, as described below—to form a porous, empty electrolyte structure 102 in the third form of the electrolyte material 100.

For example, the size of the polymer 120 can be selected to produce phase-separated domains that, when dissolved out of the electrolyte structure 102, yield open-cell pores in the electrolyte structure 102 that exhibit: a minor width greater than a maximum size of a solvated ion; and a major width less than (or only minimally greater than) a minimum size of conductive particles in the cathode. In this example, open-cell pores in the electrolyte structure 102 can exhibit average widths of ten nanometers (e.g., average minor widths of eight nanometers and average major widths of twelve nanometers), which may permit fully-solvated lithium ions approximately one-nanometer in size to flow freely through the electrolyte and which may prevent carbon black particles as small as twenty nanometers in size from flowing from the cathode into the electrolyte. In this example, the electrolyte structure 102 defines a minimum thickness of one micron over a silicon-based anode. For pores averaging widths (or diameters) of approximately ten nanometers throughout the electrolyte structure 102, the electrolyte structure 102 can thus define an aspect ratio of approximately 100:1 minimum thickness to pore size, which may resist propagation of silicon from the anode into the electrolyte structure 102 and thus prevent electric shorts caused by silicon dendrite formation inside a battery unit 202 containing the electrolyte structure 102.

6.2.5 Mechanical Integrity

Generally, a greater proportion of polymer in the electrolyte material 100 may yield greater porosity and a denser network of open-cell pores in the electrolyte structure 102, which may reduce resistance to flow of ions through the resulting electrolyte. However, greater porosity in the electrolyte structure 102 may reduce mechanical strength of the electrolyte structure 102 and yield greater probability of mechanical failure. For example, the electrolyte material 100 can be deposited and processed over an anode, a cathode can be fabricated over the resulting electrolyte, and a cathode current collector 250 can be depressed onto the cathode material 230, which may induce stresses in the electrolyte. Therefore, the electrolyte material 100 can include up to a threshold proportion of polymer that yields up to a maximum porosity and at least a minimum strength in the resulting electrolyte structure 102.

For example, the electrolyte material 100 can include 40% by weight (or volume) of the polymer, 55% by weight (or volume) of the monomer, and 5% by weight (or volume) of the photoinitiator 130. The electrolyte material 100 in the first form can be mixed with the first solvent 140, such as to a ratio of two-parts electrolyte material 100 to one-part solvent, before depositing the electrolyte material 100 onto an anode. Once monomer molecules in a volume of this electrolyte material 100 are crosslinked by activated photoinitiator 130 following exposure to electrolyte material 100 and once the polymer 120 is dissolved out of the resulting electrolyte structure 102, the electrolyte structure 102 can thus exhibit an open-cell pore volume of approximately 40%, which may yield sufficient mechanical strength to withstand applied forces during subsequent assembly of a battery unit 202.

6.3 Electrolyte Material Example

In one example shown in FIGS. 7, 8A, 8B, and 9, the electrolyte material 100 includes: approximately 55% by weight of the monomer, such as monomers of SU-8; approximately 40% by weight of the polymer, such as PMMA; and approximately 5% by weight of a photoinitiator 130, such as triarylsulfonium/hexafluoroantimonate salt. The first solvent 140 can include cyclopentanone, and both SU-8 monomer molecules and PMMA polymer molecules may be miscible in cyclopentanone. Furthermore, PMMA polymers may be chemically similar to SU-8 monomers and may therefore be semi-miscible in the SU-8 monomer.

Generally, PMMA is available in a range of molecular weights, such as from ~500 grams per mol (i.e., a short polymer with five repeat methyl methacrylate units) up to ~35,000 grams per mol (e.g., a longer polymer with 350 repeat methyl methacrylate units). The polymer 120 can include low-molecular weight PMMA, which may exhibit greater miscibility in the monomer, greater transparency to electromagnetic radiation at the activation wavelength of the photoinitiator 130, and indices of refraction similar to those of SU-8 monomers while also yielding pores of smaller cross-sectional area in the electrolyte structure 102. Alternatively, the electrolyte material 100 can include higher-molecular-weight PMMA, which may exhibit lesser miscibility in the monomer 110 and less transparency to the electromagnetic radiation at the activation wavelength when mixed with the monomer 110 but which may yield pores of greater cross-sectional area in the electrolyte structure 102.

The electrolyte material 100 can also include a proportion of the PMMA polymer of molecular weight: that is 1) sufficiently low to prevent the PMMA polymer from aggregating into an unlinked polymer nanostructure (e.g., a colloidal suspension or percolated network) with channels of cross-sectional area exceeding the target width range (e.g., significantly larger than the smallest conductive particles in the cathode) in order to prevent shorting between the anode and the cathode; and that is 2) sufficiently high to support phase separation and clustering of PMMA polymers into an unlinked nanostructure network that spans the full thickness of the electrolyte—rather than terminating inside the upper and lower bounds of the electrolyte—thereby preventing entrapment of PMMA polymer (i.e., isolated subvolumes of the PMMA polymer) within the crosslinked SU-8 monomer and enabling the second solvent 150 to reach, dissolve, and remove the PMMA polymer from these voids in the electrolyte structure 102.

For example, the electrolyte material 100 can include PMMA in a narrow band of molecular weights centered at 15,000 grams per mol (e.g., +/−1,000 grams per mol), which may yield: sufficient miscibility in the monomer 110 for near-uniform dispersal of the polymer 120 throughout a volume of electrolyte material 100; sufficient transparency to enable penetration of electromagnetic radiation into the electrolyte material 100 up to a maximum depth of 500 microns; and pores within a target width range of five nanometers to 20 nanometers in the resulting electrolyte structure 102.

Alternatively, in the first form, the second proportion of the polymer 120 can include a blend of PMMA molecules of different molecular weights, such as PMMA molecules in a first narrow band of low molecular weights and PMMA molecules in a second a narrow band of high molecular weights. For example, the electrolyte material 100 can include PMMA in a combination or range of molecular weights such as 70% of PMMA with a molecular weight of 5,000 grams per mol (e.g., +/−500 grams per mol) and 30% of PMMA with a molecular weight of 30,000 grams per mol (e.g., +/−1000 grams per mol). By thus incorporating polymers of two discrete molecular weights, the porosity in an electrolyte structure 102 formed by such an electrolyte material 100 can be tuned. More specifically, higher-molecular-weight polymers may form larger phase-separated domains and thus yield larger pores in the electrolyte structure 102, and vice versa; by incorporating polymers of two molecular weights, these polymers can thus form hierarchical porosity in the electrolyte structure 102, such as a collection of 10-50 nanometer pores.

However, the electrolyte material 100 can include any other one or more ranges of molecular weights of PMMA in any other proportion, and the electrolyte material 100 can include any other composition and/or type of the monomer, the polymer, and the photoinitiator 130 and can be mixed with the first solvent 140 of any other type. For example, the polymer 120 can include: poly(ethyl methacrylate); poly (benzyl methacrylate); polycarbonate; polysulfone; and/or various copolymers.

7. Electrolyte Fabrication

As shown in FIGS. 1, 2, 3, and 4, once the anode is fabricated in Block S110, electrolyte material 100 is deposited across a first side of the anode in Block S120 and then selectively exposed to electromagnetic radiation in Block S122 in order to crosslink the monomer 110 with the polymer 120 phase-separated from the electrolyte structure 102 and entangled to form a colloidal suspension defining a network of voids distributed throughout the electrolyte structure 102 or crosslinked monomer.

In one variation described above, the substrate 210 is etched in Block S110 to form a set of cells 212, wherein each cell in the set of cells 212 includes a base encompassed by a continuous wall 216 and a set of posts 214 extending normal to the base. In Block S120, the electrolyte material 100 can be deposited into the set of cells 212 and around each post in each cell in the set of cells 212 to fully cover the substrate 210. The thin volumes of the electrolyte material 100—adjacent vertical surfaces of the continuous wall 216 and the set of posts 214 in each cell in the set of cells 212—can then be selectively exposed to electromagnetic radiation in Block S122 in order to selectively crosslink the monomer 110 into an electrolyte structure 102 that conforms around the continuous wall 216 and the set of posts 214 in each cell in the set of cells 212; during this process, the polymer 120 can phase-separate from the crosslinked monomer in the electrolyte structure 102. The electrolyte structure 102 can then be rinsed or washed with the second solvent 150 to remove any uncrosslinked monomer from around the electrolyte structure 102 and to dissolve the polymer 120 out of the electrolyte structure 102 in Block S130.

7.1 Photomask

In the variation described above in which the battery assembly 200 defines a 3D battery, the bottom of each cell, the side and top of each post, and the sides of each wall 216 defined by the anode are coated with a substantially uniform thickness of the electrolyte material 100. In one implementation, in preparation for coating the substrate 210 with a uniform thickness of electrolyte material 100, Block S122 can include fabricating a photomask defining a window at a location of each post in the set of posts 214 in each cell and at a location of each wall 216 encompassing each cell in the set of cells 212, wherein each window is offset outwardly from a corresponding post or wall 216 by approximately a target thickness of the electrolyte structure 102. In particular, the photomask can define windows (or "opens") over designated locations of each post and over designated locations of each wall 216, as shown in FIGS. 1, 3, and 4.

For example, the photomask can include a transparent fused silica blank covered with chrome metal-absorbing film extending over each designated cell area but excluded from designated post and wall areas. In this example, the chrome metal-absorbing film can define: a set of windows, each coaxial with its corresponding post location and offset outwardly from the footprint of its corresponding post by the target thickness of the electrolyte (e.g., 10 microns); and a set of rectilinear windows, each coaxial with its corresponding wall location and offset outwardly from the footprint of its corresponding wall 216 by the target thickness of the electrolyte, as shown in FIG. 4.

7.2 Electrolyte Deposition

The electrolyte material 100 can then be deposited across the first side of the anode in Block S120, thereby filling each cell with electrolyte material 100 up to a uniform planar surface offset above the top surface of walls 216 patterned across the first side of the anode. For example, an overage of the electrolyte material 100 can be dispensed onto the first side of the anode, and a doctor blade can then be passed across the anode at a uniform height over the first side of the anode to cut the electrolyte material 100 down to a uniform target thickness over the anode, as shown in FIG. 1. Alternatively, the electrolyte material 100 can be spin-coated over the anode.

7.3 Phase Separation and Soft Bake

Prior to exposing the electrolyte material 100 to electromagnetic radiation, the electrolyte material 100 and the substrate 210 can then be soft-baked in Block S122. In one implementation, once the electrolyte material 100 is deposited onto the anode, the anode and the electrolyte material 100 can be heated during a soft-bake cycle to prepare the uncrosslinked monomer for exposure.

Time and temperature parameters of the soft-bake cycle can also be set to control phase separation of the polymer 120 from the monomer. For example, during the soft-bake cycle, the anode and electrolyte material 100 can be: heated to a high temperature (e.g., 95° C.); held at the high temperature for a period of time proportional to the thickness of the electrolyte material 100 and/or the proportion of the first solvent 140 in the electrolyte material 100 in order to evaporate the first solvent 140 out of the electrolyte material 100 (e.g., from approximately 50% by weight to less than 10% by weight first solvent 140); and then cooled slowly to an exposure temperature, thereby developing and coarsening phase separation of the polymer 120 from the monomer 110. In particular, removing the first solvent 140 from the electrolyte material 100 can initiate phase-separated of the polymer 120 from the monomer 110 as the polymer 120 comes into closer proximity to the monomer 110. Exposure to high temperature, extended soak, and a long cooling period can also yield greater phase separation of the polymer 120 from the monomer 110 by permitting the polymer 120 greater movement through the monomer, which may yield more complete clustering of polymer molecules into a thicker unlinked nanostructure network within the monomer 110 prior to crosslinking of the monomer.

In another example shown in FIG. 1, the anode and electrolyte material 100 can be quenched during the soft-bake cycle by: heating the anode and electrolyte material 100 to a target temperature; soaking the anode and electrolyte material 100 at the target temperature for a preset duration to permit phase separation of polymer molecules from the monomer 110 and clustering of polymer molecules into an unlinked nanostructure network; and then rapidly dropping the temperature of the anode and electrolyte material 100 in order to freeze the unlinked polymer nanostructure in the monomer 110 prior to crosslinking of the monomer. In these examples, the durations and temperatures of heating, soak, and cooling period in the soft-bake cycle can be set to achieve a target degree of phase separation and clustering of the polymer 120 in order to achieve target density and thickness of the polymer 120 network, which can yield target porosity and pore size of the electrolyte once the battery assembly 200 is completed.

However, the electrolyte material 100 can be processed during a soft-bake cycle of any other duration or temperature.

7.4 Exposure

Then, in Block S122: the photomask can be arranged over the substrate 210 with windows in the photomask aligned to corresponding posts in each cell in the set of cells 212; and the electrolyte material 100 can be exposed to electromagnetic radiation through the photomask in order to selectively disassociate the photoinitiator 130 into the reactive subspecie around vertical surfaces in each cell in the set of cells 212.

In particular, in Block S122, the photomask can be located over and aligned to the substrate 210; the electrolyte material 100 is then exposed to radiation through the photomask in order to selectively cure the electrolyte over the tops of the posts and walls 216 and down the vertical surfaces of the posts and walls 216 while leaving electrolyte material 100 between adjacent posts and between the walls 216 and posts generally uncrosslinked. Because the photomask defines windows (i.e., openings) offset beyond the vertical surfaces of the posts and walls 216 by the target thickness of the electrolyte (or by a similar geometry compensated for by optical magnification of processing equipment), the photomask can pass radiation toward the electrolyte material 100 to activate the photoinitiator 130 in local volumes of the electrolyte material 100—of the target thickness—over tops and across vertical surfaces of the posts and walls 216 in each cell of the substrate 210 in Block S122. Furthermore, by blocking light from reaching electrolyte material 100 further offset from these surfaces in the cells, the photomask can shield these other local volumes of electrolyte material 100 from radiation exposure, thereby preventing the photoinitiator 130 from dissociating into the reactive subspecie in these other local volumes of electrolyte material 100 and thus preventing local crosslinking of the monomer 110 in these other local volumes in Block S122.

7.5 Post-Exposure Bake and Development

After exposing the electrolyte material 100 to electromagnetic radiation, the electrolyte material 100 and the substrate 210 can be baked in Block S122 in order to crosslink monomers in local volumes of the electrolyte material 100 containing the reactive subspecie. In one implementation, once select volumes of the electrolyte material 100 are exposed to electromagnetic radiation, the anode and the electrolyte material 100 can be heated during a post-exposure bake cycle in order to further crosslink the monomer 110—around the polymer 120 network—in these exposed volumes of the electrolyte material 100, as shown in FIG. 1.

7.6 Polymer Removal

In Block S130, the polymer 120 can then be dissolved out of the electrolyte structure 102 with a volume of solvent in order to render a network of open-cell pores in the electrolyte structure 102. Generally, in Block S130, the electrolyte structure 102 and crosslinked electrolyte material 100 can be washed or rinsed with a solvent to both dissolve the polymer 120 out of the electrolyte structure 102 and to dissolve remaining electrolyte material 100—unexposed to electromagnetic radiation—from the electrolyte structure 102, as shown in FIGS. 1 and 2.

In the implementation described above in which the polymer 120 includes PMMA, the electrolyte structure 102 can be washed with the second solvent 150 (e.g., cyclopentanone or propylene glycol monomethyl ether acetate) or with another organic solvent (e.g., a blend of dimethoxyethane and N-Methyl-2-pyrrolidone), which may fully swell the electrolyte structure 102, dissolve away the polymer 120 from pores in the electrolyte structure 102 to render open channels for ion transport through the electrolyte structure 102, and solvate ions for transport through the electrolyte structure 102. For example, the battery assembly 200—including the electrolyte structure 102 and the anode—can be immersed in a heated bath of the second solvent 150 and agitated for a duration of time, removed from the bath, and dried in order to remove the polymer 120 from the electrolyte structure 102 before fabrication of the cathode over the electrolyte structure 102.

Furthermore, the battery assembly 200 (or a battery unit 202 separated from the battery assembly 200) can be packaged for placement into solder paste on a PCB and then processed in a reflow oven with other surface- or through-mount electrical components, as described above, to affix the battery assembly 200 (or unit) to the PCB. However, reflow temperatures may exceed the glass transition temperature of the SU-8, which may trigger further crosslinking between SU-8 monomer molecules, especially in the presence of additional photoinitiator 130 or reactive subspecie. Because PMMA molecules that created voids in the monomer 110 are (predominately) replaced with the third solvent 160 and solvated ions once the electrolyte material 100 is crosslinked and once the battery assembly 200 is completed, further crosslinking of yet-unlinked SU-8 monomer molecules across voids in the electrolyte material 100 may narrow or even fully close these voids, thereby reducing internal conductivity of the battery and reducing performance of the battery assembly 200. Therefore, to prevent such crosslinking after fabrication of the battery assembly 200, the electrolyte structure 102 material can be thoroughly washed in a solvent that dissolves the photoinitiator 130 in Block S130 in order to remove photoinitiator 130 remaining in the electrolyte structure 102.

7.7 Solvated Ion Introduction

In Block S142, the porous electrolyte structure 102 is exposed to solvent and ions to fill the network of open-cell pores in the electrolyte structure 102 with solvated ions, thereby completing the electrolyte. Generally, in Block S142, solvated ions are introduced to the electrolyte structure 102 in order to fill the network of open-cell pores and thus enable this electrolyte structure 102 to function as an ion-carrying (e.g., a lithium-ion-carrying) electrolyte, as shown in FIGS. 1 and 10.

In one implementation, once the electrolyte structure 102 is dried following Block S130, the electrolyte structure 102 is rewetted directly with lithium ions dissolved in the third solvent 160 (e.g., propylene carbonate and/or other solvents), such as by dispensing metered volumes of the third solvent 160 and solvated lithium ions into each cell in the 3D anode described above, in Block S142. The third solvent 160 and solvated lithium ions can then wick into the porous electrolyte structure 102 to complete the electrolyte.

In another implementation described below, once the electrolyte structure 102 is dried following Block S130, cathode material 230—containing lithium-storing material, conductive particles, and a binder mixed with a volume of solvent—is deposited over the electrolyte structure 102, such as into each cell in the 3D anode, in Block S140. The cathode material 230 can then be dried to form a porous cathode over the electrolyte structure 102. Finally, the volume of solvent can be dispensed onto the porous cathode (e.g., into each cell) in Block S142 to wet the porous cathode and to draw solvated lithium ions from the porous cathode into the network of open-cell pores in the adjacent electrolyte structure 102.

8. Cathode

One variation of the method S100 shown in FIGS. 1, 2, 3, and 4 includes Block S140, which recites depositing a cathode material 230—including lithium-storing material—over the electrolyte structure 102 opposite the anode. In this variation, Block S140 can include wetting the cathode material 230 with a volume of solvent to draw solvated lithium ions from the cathode material 230 into the network of open-cell pores in the electrolyte structure 102, as described above.

In one implementation, the cathode material 230 includes: active lithium-storing material; carbon (e.g., graphitic carbon or carbon black), which is electrically conductive; a binder; and a lithium salt that dissolves in the third solvent 160 and supports transport of lithium ions through the electrolyte. The cathode material 230 can contain lithium salts that are soluble in the third solvent 160. The third solvent 160 can thus function to dissolve lithium ions contained in the cathode material 230 and to conduct these lithium ions into the electrolyte; when combined with lithium salt in the cathode material 230, the third solvent 160 can thus function as a secondary electrolyte phase.

For example, the active lithium-storing material can include: $LiNi_{1/3}Mn_{1/3}Co_{1/3}O_2$ dispersed in the third solvent 160 (e.g., N-Methyl-2-pyrrolidone, Dimethyl sulfoxide, etc.); and $LiPf_6$ and/or $LiBF_4$ (i.e., lithium salt). In this example, the cathode material 230 can include: approximately 90% active lithium-storing material; approximately 10% conductive particles (e.g., carbon black); and approximately 1% binder. The cathode material 230 can be dispersed in solvent (e.g., N-Methyl-2-pyrrolidone, Dimethyl sulfoxide) to achieve a low viscosity sufficient to flow the cathode material 230 over the electrolyte structure 102 and can naturally achieve some porosity when dry, such as approximately 40% porosity.

Once deposited over an electrolyte structure 102, the cathode material 230 can be hardened (or "cured") by drying a cathode processing solvent out of the cathode material 230, thereby causing the binder to solidify to form a flexible cathode encompassing the sides and tops of posts within the cell and separated from the base of the cell, the walls 216 of the cell, and posts in the cell by the electrolyte.

In one implementation, a volume of cathode material 230 is dispersed in the third solvent 160 and then dispensed over the electrolyte structure 102 previously fabricated in each cell on the substrate 210. For example, the cathode material 230 can be dispersed in a proportion of the third solvent 160 (e.g., 70-80%) sufficient for the cathode material 230 to be flowed into each cell with an automated dropper or dispenser and to dissolve the lithium salt into ions. This battery assembly 200 can then be agitated, placed in a vacuum chamber, and/or placed in a pressure chamber in order to force the third solvent 160 and solvated ions into open-cell pores in the electrolyte structure 102 and to remove gases trapped in the cathode material 230 and inside the electrolyte structure 102.

Furthermore, once cathode material 230 is deposited into the cells for a target period of time, the assembly can be heated to evaporate the third solvent 160 from the cathode material 230, such as down to 5% by mass in the cathode, in order to "cure" the cathode material 230 and achieve a target battery assembly 200 composition. By maintaining a minimum proportion of the third solvent 160 in the cathode material 230 at the conclusion of the cathode curing cycle, the cathode material 230 may: remain fluid and/or flexible and may therefore deform more readily against a current collector installed over the cathode without requiring rewetting, thereby improving mechanical and electrical coupling between the cathode material 230 and the current collector. The third solvent 160 remaining in the cured cathode can also solvate lithium ions in the cathode and function to transport these solvated lithium ions between the anode and the cathode via voids in the electrolyte.

Alternatively, once the cathode material 230 is deposited over the electrolyte structure 102, the cathode material 230 and the electrolyte structure 102 can be fully dried; a known volume of solvent can then be deposited onto the cathode material 230 in each cell to dissolve lithium salt in these volumes of cathode material 230 and to draw solvated lithium ions into adjacent electrolyte structure 102S in the battery assembly 200.

However, the cathode can be formed in any other way in Block S140, and the electrolyte structure 102 can be filled with solvated ions in any other way in Block S142.

The completed electrolyte can thus communicate solvated ions from the cathode to the anode when a battery unit 202—dissected from the battery assembly 200—is charged and from the anode to the cathode when the battery unit 202 is discharged while also electrically isolating the cathode from the anode.

8.4 Polymer Gradient

In one variation shown in FIG. 10, in addition to the active lithium-storing material, conductive particles, and lithium salt described above, the cathode material 230 also includes a second volume of the polymer. The cathode material 230 can be mixed with a volume of the third solvent 160 when deposited onto an electrolyte structure 102. This volume of the third solvent 160 can wick into the electrolyte structure 102, dissolve the polymer 120, and then draw the polymer 120 out of the electrolyte structure 102 and toward the cathode, thereby yielding a smooth change in density of the polymer 120 from the electrolyte to the cathode, which may improve performance of the battery while also clearing the polymer 120 from pores in the electrolyte structure 102 to make room for solvated ions from the cathode in a small number of production steps.

In particular, for polymer remaining in voids in the electrolyte structure 102 when the cathode is fabricated over the electrolyte, the third solvent 160 mixed with the cathode material 230 can fully wet the electrolyte structure 102 and dissolve polymer molecules remaining in the electrolyte structure 102. These dissolved polymer molecules may move from the electrolyte structure 102 into the cathode—which may also contain the polymer 120—over time, thereby clearing the network of open-cell pores in the electrolyte structure 102 for solvated ions while also yielding a relatively smooth density gradient of polymer across the electrolyte-cathode boundary, which may yield improved battery performance and battery longevity.

In this variation, polymer in the cathode can also function as a colloid or gelling agent to bind the cathode together.

9. Processing

Following Block S140, the battery assembly 200 can thus include a substrate 210 defining a set of cells 212 coated with electrolyte structure 102 material and filled with cured cathode material 230. A current collector can then be attached and sealed over the cathode, the battery assembly 200 can be diced in individual cells or groups of cells, and these individual cells or groups of cells can be packaged to form multiple discrete batteries, as shown in FIGS. 2 and 12. For example, one or a set of cells 212 can be encased in an SMT or through-hole package for installation directly onto a PCB. Each SMT or through-hole battery can then be adhered to a PCB—along with other circuit components—with solder paste and then passed through a reflow oven, such as at a temperature of approximately 225° C., to reflow the solder paste, thereby affixing both circuit components and the battery to the PCB simultaneously and thereby completing the PCB in a single pick-and-place and reflow cycle. In this example and as described above, the third solvent 160 can include propylene carbonate, which may exhibit a high boiling point (e.g., 242° C.) and low flammability. Because the boiling point of the third solvent 160 is greater than the reflow temperature of solder paste, the solvent can remain in liquid phase inside the SMT or through-hole battery such that pressure inside the battery remains sufficiently low to prevent rupture or blowout. Low flammability of the third solvent 160 can also yield low fire or explosion risk for the SMT or through-hole battery, even when passed through a reflow oven.

10. Other Electrolyte Applications

Generally, the method S100 is described above for fabricating a conformable, rigid electrolyte in the context of fabricating a 3D battery on a silicon wafer. However, similar methods and techniques can be implemented to produce a conformable, rigid electrolyte within a 2D battery, such as by fabricating an electrolyte film of uniform thickness onto a planar anode and then depositing or assembling a planar cathode over the electrolyte film. Similarly, these methods, techniques, and materials can be implemented to produce a 2D or 3D hydrogen fuel cell containing an electrolyte film that defines a controlled density and distribution of relatively large pores that enable improved hydrogen-ion conduction through the fuel cell. Furthermore, these methods, techniques, and materials can be implemented to produce a 2D or 3D nickel metal-hydride battery containing an electrolyte film that defines a controlled density and distribution of relatively large pores that enable improved hydrogen-ion conduction through the nickel metal-hydride battery.

However, the electrolyte material 100 can be applied and processed in any other way to form a conformable, rigid electrolyte. Similarly, the method S100 can be implemented in any other way to fabricate a conformable, rigid electrolyte, such as directly over an electrode or separately from an electrode.

As a person skilled in the art will recognize from the previous detailed description and from the figures and claims, modifications and changes can be made to the embodiments of the invention without departing from the scope of this invention as defined in the following claims.

I claim:

1. A method for fabricating an electrolyte comprising:
   depositing an electrolyte material over a substrate, the electrolyte material comprising a monomer miscible in a first volume of solvent, a polymer semi-miscible in the monomer and miscible in the first volume of solvent, and a photoinitiator;
   during a first period of time:
     heating the electrolyte and the substrate to a first temperature;
     soaking the electrolyte and the substrate at the first temperature for a first duration of time to promote phase-separation of the polymer from the monomer and cluster of the polymer into an unlinked polymer network; and
     cooling the electrolyte material and the substrate to freeze the unlinked polymer network in the monomer;
   during a second period of time succeeding the first period of time, exposing the electrolyte material to electromagnetic radiation to disassociate the photoinitiator into a reactive subspecie that crosslinks the monomer to form an electrolyte structure with the polymer phase-separated from the electrolyte structure;
   dissolving the polymer out of the electrolyte structure with a second volume of solvent to render a network of open-cell pores in the electrolyte structure; and
   exposing the electrolyte structure to a third volume of solvent and ions to fill the network of open-cell pores with solvated ions.

2. The method of claim 1:
   wherein depositing the electrolyte material over the substrate comprises depositing the electrolyte material over the substrate comprising an anode;
   further comprising depositing a cathode material over the electrolyte structure opposite the anode, the cathode material comprising lithium-storing material; and
   wherein exposing the electrolyte structure to the third volume of solvent and ions comprises wetting the cathode material with the third volume of solvent to draw solvated lithium ions from the cathode material into the network of open-cell pores in the electrolyte structure.

3. The method of claim 1:
   wherein exposing the electrolyte material to electromagnetic radiation comprises selectively exposing the electrolyte material to electromagnetic radiation to crosslink the monomer to form the electrolyte structure with the polymer phase-separated from the electrolyte structure and entangled to form a suspension inhibiting local crosslinking of the monomer throughout the electrolyte material; and
   wherein dissolving the polymer out of the electrolyte structure comprises rinsing the electrolyte structure with the second volume of solvent to dissolve the polymer in the suspension out of the electrolyte structure to render the network of open-cell pores, characterized by an upper bound in cross-sectional dimension, in the electrolyte structure.

4. The method of claim 3, further comprising depositing a cathode material over the electrolyte structure, the cathode material comprising:
   a first proportion of lithium-storing material; and
   a second proportion of conductive particles less than the first proportion and exhibiting a lower size bound greater than the upper size bound in cross-sectional dimension of open-celled pores in the electrolyte structure.

5. The method of claim 1:
   further comprising etching the substrate to form a set of cells, each cell in the set of cells comprising a base encompassed by a continuous wall and a set of posts extending normal to the base;
   wherein depositing the electrolyte material over the substrate comprises depositing the electrolyte material into the set of cells and around each post in each cell in the set of cells;
   wherein exposing the electrolyte material to electromagnetic radiation comprises selectively exposing thin volumes of the electrolyte material, adjacent vertical surfaces of the continuous wall and the set of posts in each cell in the set of cells, to electromagnetic radiation to selectively crosslink the monomer into the electrolyte structure that conforms around the continuous wall and the set of posts in each cell in the set of cells, the polymer phase-separated from the electrolyte structure; and
   wherein dissolving the polymer out of the electrolyte structure with the second volume of solvent comprises rinsing the electrolyte structure with the second volume of solvent to remove uncrosslinked monomer from around the electrolyte structure and to dissolve the polymer out of the electrolyte structure.

6. The method of claim 5, wherein exposing the electrolyte material to electromagnetic radiation comprises:
   fabricating a photomask defining a window at a location of each post in the set of posts in each cell in the set of cells, each window offset outwardly from a corresponding post by approximately a target thickness of the electrolyte structure;
   filling each cell, in the set of cells, with the electrolyte material;
   arranging the photomask over the substrate with windows in the second photomask aligned to corresponding posts in each cell in the set of cells; and
   exposing the electrolyte material to electromagnetic radiation through the photomask to selectively disassociate the photoinitiator into the reactive subspecie around vertical surfaces in each cell in the set of cells.

7. The method of claim 1:
wherein depositing the electrolyte material over the substrate comprises depositing the electrolyte material comprising a first proportion of the monomer and a second proportion of the polymer dissolved in the first volume of solvent; and
wherein dissolving the polymer out of the electrolyte structure comprises rinsing the electrolyte structure with the second volume of solvent to render approximately the second proportion of open-cell volume in the electrolyte structure.

8. The method of claim 7:
wherein depositing the electrolyte material over the substrate comprises depositing the electrolyte material:
comprising between 55% and 65% by volume of the monomer comprising an epoxy-based negative photoresist;
comprising between 35% and 45% by volume of the polymer comprising a synthetic polymer of an organic compound; and
dissolved in the first volume of solvent comprising an organic cyclic ketone solvent; and
wherein dissolving the polymer out of the electrolyte structure comprises rinsing the electrolyte structure with the organic cyclic ketone solvent to dissolve the polymer out of the electrolyte structure.

9. The method of claim 1:
further comprising, following the second period of time, baking the electrolyte material and the substrate to crosslink monomers in local volumes of the electrolyte material containing the reactive subspecie generated by the photoinitiator responsive to selective exposure to electromagnetic radiation; and
wherein dissolving the polymer out of the electrolyte structure with the second volume of solvent comprises rinsing the electrolyte structure with the second volume of solvent to dissolve the polymer out of the electrolyte structure and to dissolve electrolyte material unexposed to electromagnetic radiation from the electrolyte structure.

10. The method of claim 1, wherein depositing the electrolyte material over the substrate comprises doctor-blading the electrolyte material over the substrate.

11. A method for fabricating an electrolyte comprising:
depositing an electrolyte material over a substrate, the electrolyte material comprising a monomer miscible in a first volume of solvent, a polymer semi-miscible in the monomer and miscible in the first volume of solvent, and a photoinitiator;
at a first time, heating the electrolyte material and the substrate;
at a second time succeeding the first time, exposing the electrolyte material to electromagnetic radiation to disassociate the photoinitiator into a reactive subspecie that crosslinks the monomer to form an electrolyte structure with the polymer phase-separated from the electrolyte structure;
at a third time succeeding the second time, heating the electrolyte material and the substrate to crosslink monomers in local volumes of the electrolyte material containing the reactive subspecie generated by the photoinitiator responsive to selective exposure to electromagnetic radiation;
dissolving the polymer out of the electrolyte structure with a second volume of solvent to dissolve the polymer out of the electrolyte structure and to dissolve electrolyte material unexposed to electromagnetic radiation from the electrolyte structure and to render a network of open-cell pores in the electrolyte structure; and
exposing the electrolyte structure to a third volume of solvent and ions to fill the network of open-cell pores with solvated ions.

12. The method of claim 11, wherein heating the electrolyte material and the substrate at the first time comprises:
heating the electrolyte and the substrate to a first temperature;
soaking the electrolyte and the substrate at the first temperature for a first duration of time to promote phase-separation of the polymer from the monomer and cluster of the polymer into an unlinked polymer network; and
cooling the electrolyte material and the substrate to freeze the unlinked polymer network in the monomer.

13. The method of claim 11:
wherein exposing the electrolyte material to electromagnetic radiation comprises selectively exposing the electrolyte material to electromagnetic radiation to cross-link the monomer to form the electrolyte structure with the polymer phase-separated from the electrolyte structure and entangled to form a colloidal suspension defining the network of open-cell pores distributed throughout the electrolyte structure; and
wherein dissolving the polymer out of the electrolyte structure comprises rinsing the electrolyte structure with the second volume of solvent to dissolve the polymer, in colloidal suspension, out of the electrolyte structure to render the network of open-cell pores, characterized by an upper bound in cross-sectional dimension, in the electrolyte structure.

14. The method of claim 11, wherein heating the electrolyte material and the substrate at the first time comprises soft-baking the electrolyte material and the substrate prior to exposing the electrolyte material to electromagnetic radiation.

15. A method for fabricating an electrolyte comprising:
depositing an electrolyte material over a substrate, the electrolyte material dissolved in a first volume of organic cyclic ketone solvent and comprising:
a first proportion between 55% and 65% by volume of a monomer miscible in solvent and comprising an epoxy-based negative photoresist;
a second proportion between 35% and 45% by volume of a polymer semi-miscible in the monomer, miscible in solvent, and comprising a synthetic polymer of an organic compound; and
a photoinitiator;
exposing the electrolyte material to electromagnetic radiation to disassociate the photoinitiator into a reactive subspecie that crosslinks the monomer to form an electrolyte structure with the polymer phase-separated from the electrolyte structure;
dissolving the polymer out of the electrolyte structure with a second volume of organic cyclic ketone solvent to render a network of open-cell pores defining approximately the second proportion of open-cell volume in the electrolyte structure; and
exposing the electrolyte structure to a third volume of solvent and ions to fill the network of open-cell pores with solvated ions.

16. A method for fabricating an electrolyte comprising:
etching a substrate to form a set of cells, each cell in the set of cells comprising a base encompassed by a continuous wall and a set of posts extending normal to the base;
depositing an electrolyte material over the substrate, into the set of cells, and around each post in each cell in the set of cells, the electrolyte material comprising a monomer miscible in a first volume of solvent, a polymer semi-miscible in the monomer and miscible in the first volume of solvent, and a photoinitiator;
selectively exposing thin volumes of the electrolyte material, adjacent vertical surfaces of the continuous wall and the set of posts in each cell in the set of cells, to electromagnetic radiation to selectively disassociate the photoinitiator into a reactive subspecie that crosslinks the monomer to form an electrolyte structure that conforms around the continuous wall and the set of posts in each cell in the set of cells, the polymer phase-separated from the electrolyte structure;
rinsing the electrolyte structure with a second volume of solvent to remove uncrosslinked monomer from around the electrolyte structure, to dissolve the polymer out of the electrolyte structure, and to render a network of open-cell pores in the electrolyte structure; and
exposing the electrolyte structure to a third volume of solvent and ions to fill the network of open-cell pores with solvated ions.

17. The method of claim 16:
further comprising depositing, over the electrolyte structure, a cathode material comprising lithium-storing material, conductive particles, and a binder mixed in a fourth volume of solvent;
further comprising drying the cathode material to form a porous cathode over the electrolyte structure; and
wherein exposing the electrolyte structure to the third volume of solvent comprises dispensing the third volume of solvent onto the porous cathode to wet the porous cathode and to draw solvated lithium ions from the porous cathode into the network of open-cell pores in the electrolyte structure.

18. The method of claim 16:
wherein depositing the electrolyte material over the substrate comprises depositing the electrolyte material:
comprising between 55% and 65% by volume of the monomer comprising an epoxy-based negative photoresist;
comprising between 35% and 45% by volume of the polymer comprising a synthetic polymer of an organic compound; and
dissolved in the first volume of solvent comprising an organic cyclic ketone solvent; and
wherein dissolving the polymer out of the electrolyte structure comprises rinsing the electrolyte structure with the organic cyclic ketone solvent to dissolve the polymer out of the electrolyte structure.

* * * * *